(12) United States Patent
Sato

(10) Patent No.: US 7,495,789 B2
(45) Date of Patent: Feb. 24, 2009

(54) SETTING BINDING POSITION AND ADDITIONAL INFORMATION POSITION IN A PAGE OF A DOCUMENT

(75) Inventor: Junko Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 977 days.

(21) Appl. No.: 10/886,551

(22) Filed: Jul. 9, 2004

(65) Prior Publication Data

US 2005/0008387 A1    Jan. 13, 2005

(30) Foreign Application Priority Data

Jul. 9, 2003    (JP) .............................. 2003-194545

(51) Int. Cl.
*G06F 3/12* (2006.01)
*G06K 15/00* (2006.01)
(52) U.S. Cl. ...................... 358/1.15; 358/1.13; 358/1.18
(58) Field of Classification Search ................ 358/1.15, 358/1.13, 1.18, 1.1, 1.12, 1.14, 407, 468, 358/1.6, 1.9, 1.11, 1.16, 1.17, 450, 498, 1.2; 399/403, 407, 408, 1, 8, 361, 362; 715/200, 715/211, 232, 251, 274, 273; 347/2, 3, 5, 347/14, 23
See application file for complete search history.

(56) References Cited

U.S. PATENT DOCUMENTS 7,203,900 B2    4/2007    Nara et al.

2002/0069228 A1 *    6/2002    Mori et al. ................... 707/524
2003/0056174 A1    3/2003    Nara et al. ................... 715/514
2003/0056178 A1    3/2003    Sato ........................... 715/527
2004/0133856 A1    7/2004    Miyazato et al. ............ 715/517

FOREIGN PATENT DOCUMENTS

| JP | 5-553 | 1/1993 |
|---|---|---|
| JP | 7-137392 | 5/1995 |
| JP | 7-168818 | 7/1995 |
| JP | 7168818 | 7/1995 |
| JP | 11-298713 A | 10/1999 |
| JP | 2000-25278 A | 1/2000 |
| JP | 2002073595 | 3/2002 |
| JP | 2003271515 | 3/2002 |
| JP | 2003-91407 A | 3/2003 |
| JP | 2003-91520 A | 3/2003 |
| JP | 2003091521 | 3/2003 |

* cited by examiner

*Primary Examiner*—Dov Popovici
(74) *Attorney, Agent, or Firm*—Fitzpatrick, Cella, Harper & Scinto

(57) ABSTRACT

The claimed invention is directed to an information processing apparatus for adding additional information to each page of a document. The apparatus includes a print setup unit for setting a binding position for a document, an additional information setup unit for setting a position of additional information to be added to each page of the document, and a rendering unit for rendering the additional information at an appropriate position on the basis of the position set by the additional information setup unit. When the additional information setup unit sets a relative position to a binding position, a rendering position of the additional information is determined for each page in accordance with the set relative position and the binding position set by the print setup unit.

15 Claims, 29 Drawing Sheets

FIG. 4A

| NO | PROPERTY INFORMATION | | REMARKS |
|---|---|---|---|
| 1 | PRINT METHOD | SINGLE-SIDED / DUAL-SIDED / BOOKLET PRINT | |
| 2 | PAPER SIZE | ORIGINAL SIZE / FIXED SIZE | · DESIGNATE Z-FOLD UPON DESIGNATION OF "A4+A3", "B4+B3", "LETTER+LEDGER (11 × 17)"<br>· AUTOMATICALLY ORIGINAL SIZE OF 1 CHAPTER/FIRST PAGE UPON DESIGNATION OF BOOKLET PRINT OR N-up PRINT |
| 3 | PAPER DIRECTION | PORTRAIT / LANDSCAPE | · SELECTABLE ONLY FOR FIXED SIZE |
| 4 | BINDING MARGIN / BINDING DIRECTION | | · ALLOW SHIFT/ENLARGEMENT REDUCTION DESIGNATION |
| 5 | N-up PRINT | NUMBER OF PAGES / LAYOUT ORDER / BOUNDARY LINE / LAYOUT POSITION, ETC. | · 9 PATTERNS OF LAYOUT POSITIONS<br>· ALLOW EQUAL-MAGNIFICATION PRINT DESIGNATION |
| 6 | ENLARGEMENT REDUCTION | ON/OFF | ON IS AUTOMATICALLY DESIGNATED WHEN PAPER SIZE = FIXED SIZE OR N-up PRINT IS SELECTED; OFF CAN BE DESIGNATED |
| 7 | WATERMARK | | · ALLOW INDIVIDUAL DESIGNATION FOR LOGICAL PAGE UNIT AND PHYSICAL PAGE UNIT<br>· FOR ALL CHAPTERS / ALL PAGES |

FIG. 4B

| 8 | HEADER / FOOTER | | · ALLOW INDIVIDUAL DESIGNATION FOR LOGICAL PAGE UNIT AND PHYSICAL PAGE UNIT<br>· FOR ALL CHAPTERS/ALL PAGES |
| --- | --- | --- | --- |
| 9 | EXHAUST METHOD | STAPLE / PUNCH HOLE | · STAPLE/PUNCH CAN BE DESIGNATED FOR ONLY SINGLE-SIDED/DUAL-SIDED PRINT<br>· 1 STAPLE POSITION/2 STAPLE POSITIONS |
| 10 | BOOKLET DETAIL | OPEN DIRECTION/SADDLE STITCHING/ ENLARGEMENT · REDUCTION DESIGNATION/BINDING MARGIN / SEPARATE VOLUME DESIGNATION | · ONLY IN BOOKLET PRINT |
| 11 | FRONT / BACK COVER | | · PRINT DESIGNATION FOR FRONT COVER 1/2 AND BACK COVER 1/2<br>· PAPER FEED PORT (INCLUDING INSERTER) DESIGNATION |
| 12 | INDEX SHEET | | · CHARACTER STRING PRINT ON INDEX PORTION AND ANNOTATION ON INDEX SHEET CAN BE SET<br>· BOOKLET PRINT CANNOT BE DESIGNATED |
| 13 | INSERTING SHEET | | · PAPER FEED PORT (INCLUDING INSERTER) DESIGNATION<br>· ORIGINAL DATA CAN BE PRINTED ON INSERTING SHEET<br>· BOOKLET PRINT CANNOT BE DESIGNATED |
| 14 | CHAPTER DIVISION | "NONE" / "PAGE CHANGE" / "PAPER CHANGE" | · "PAPER CHANGE" IS FIXED WHEN INDEX SHEET OR INSERTING SHEET IS DESIGNATED<br>· "PAPER CHANGE" FOR SINGLE-SIDED PRINT |

FIG. 5

| NO | PROPERTY INFORMATION | | REMARKS |
|---|---|---|---|
| 1 | PAPER SIZE | ORIGINAL SIZE / FIXED SIZE | • AUTOMATICALLY DESIGNATE "PAPER CHANGE" UPON SELECTION OF FIXED SIZE<br>• PAPER SIZE CAN BE CHANGED FOR ONLY DESIGNATED PAPER SHEET WHEN A PLURALITY OF PAPER SHEETS ARE SELECTED IN BOOK ; PAPER SIZE CAN BE CHANGED EVEN IN DESIGNATION THAT SETS PAPER SIZE IN CORRESPONDENCE WITH BOOK |
| 2 | PAPER DIRECTION | PORTRAIT / LANDSCAPE | • SELECTABLE ONLY FOR FIXED SIZE |
| 3 | N-up PRINT | NUMBER OF PAGES / LAYOUT ORDER / BOUNDARY LINE / LAYOUT POSITION, ETC. | • 9 PATTERNS OF LAYOUT POSITIONS<br>• ALLOW EQUAL-MAGNIFICATION PRINT DESIGNATION |
| 4 | ENLARGEMENT REDUCTION | ON / OFF | • ON IS AUTOMATICALLY DESIGNATED WHEN PAPER SIZE = FIXED SIZE OR N-up PRINT IS SELECTED ; OFF CAN BE DESIGNATED |
| 5 | WATERMARK | DISPLAY ON / OFF | • DESIGNATE WHETHER OR NOT ALL WATERMARKS DESIGNATED IN BOOK ARE TO BE DISPLAYED |
| 6 | HEADER / FOOTER | DISPLAY ON / OFF | • DESIGNATE WHETHER OR NOT ALL HEADERS / FOOTERS DESIGNATED IN BOOK ARE TO BE DISPLAYED |
| 7 | EXHAUST METHOD | STAPLE | • OFF IS SELECTABLE WHEN STAPLE IS DESIGNATED IN BOOK ; DEFAULT = ON |

FIG. 6

| NO | PROPERTY INFORMATION | | REMARKS |
|---|---|---|---|
| 1 | PAGE ROTATION DESIGNATION | | · ALLOW TO DESIGNATE 0 / 90 / 180 / 270 ° |
| 2 | WATERMARK | DISPLAY ON/OFF | · DESIGNATE WHETHER OR NOT ALL WATERMARKS DESIGNATED IN BOOK ARE TO BE DISPLAYED |
| 3 | HEADER / FOOTER | DISPLAY ON/OFF | · DESIGNATE WHETHER OR NOT ALL HEADERS / FOOTERS DESIGNATED IN BOOK ARE TO BE DISPLAYED |
| 4 | ZOOM | 50% - 200% | · DESIGNATE RELATIVE ZOOM RATIO WHEN SIZE THAT FITS VIRTUAL LOGICAL PAGE REGION = 100% |
| 5 | LAYOUT POSITION | | · DESIGNATE FIXED 9 PATTERNS AND ARBITRARY POSITION |
| 6 | ANNOTATION | | |
| 7 | VARIABLE ITEM | | |
| 8 | PAGE DIVISION | | |

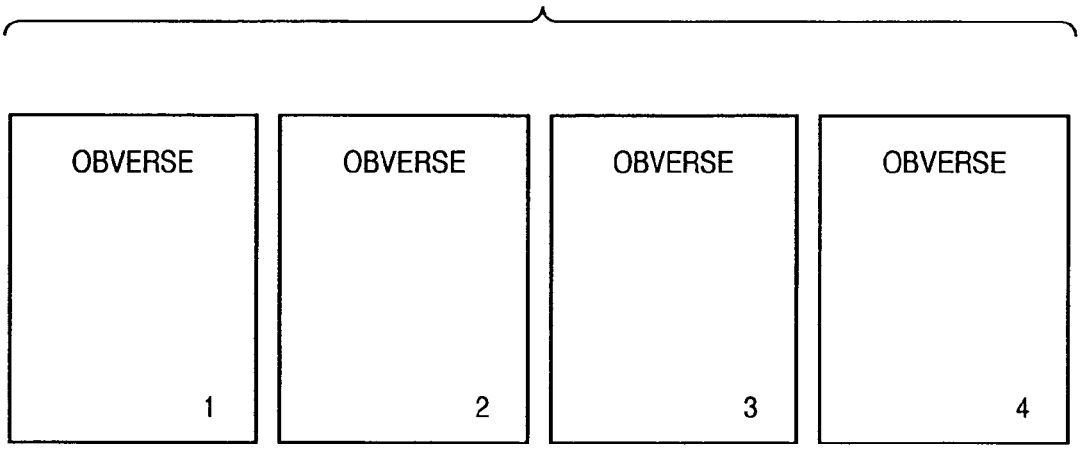
F I G. 25

SETTING BINDING POSITION AND ADDITIONAL INFORMATION POSITION IN A PAGE OF A DOCUMENT

CLAIM OF PRIORITY

This application claims priority from Japanese Patent Application No. 2003-194545 filed on Jul. 9, 2003, the entire content of which is hereby incorporated by reference.

FIELD OF THE INVENTION

The present invention relates to an information processing apparatus and method, which provide a print setup function to document data generated by, e.g., a document processing program.

BACKGROUND OF THE INVENTION

Since different types of data such as text data, table data, image data, and the like require different structures used to define these data, and different edit operations for these data, various application programs corresponding to various types of data have been proposed. Therefore, the user who uses these data must selectively use these applications in correspondence with the types of data: a text processing program upon editing text data, a spreadsheet program upon editing table data, an image edit program upon editing an image, and so forth.

In this manner, the users normally selectively use application programs in correspondence with the types of data. However, the user normally creates a document which includes a plurality of types of data such as text and table data, text and image data, and the like in place of a document which includes only one type of data such as text data alone, table data alone, image data alone, or the like. Hence, in order to create a document including a plurality of types of data, the user must create a desired document by using respective applications to print respective data using print functions of various applications, and combining printouts in a desired order.

Alternatively, a program, called an office suite, which forms an integrated application by various applications, provides a function of forming a single document by combining data generated by respective applications. Using such integrated application, the user can combine data generated by respective applications into one document using a specific application included in that integrated application.

However, when the user wants to generate a single, target document upon adding page numbers to respective pages by combining printouts of various applications, he or she must temporarily print out all required data, combine these printouts as a document, and determine page numbers to be added. For example, even when an application program has a function of assigning page numbers, the user must designate those for discontinuous pages. Also, when a layout of document pages is redone, page numbers must be re-assigned accordingly. Even when only a document format is changed without changing the data contents, so as to combine a plurality of original pages into one page as a printout (such page is called a physical page or print page), or to change, e.g., a single-sided print mode to a dual-sided print mode, edit and print processes must be redone by applications.

In this manner, since different applications are required to manage different types of data, the user himself or herself must manually provide an interface among the applications. This requires considerable labor of the user, and deteriorates the productivity. Furthermore, since many manual operations are required, errors readily occur.

In recent years, an integrated application (also called a print control application) which has a function of creating a single, target document by combining printouts of various applications, and assigning headers/footers including page numbers and the like to respective pages of the created document has been proposed (Japanese Patent Laid-Open No. 2003-091520).

Also, recent printer drivers have a function of assigning page numbers to respective pages, (Japanese Patent Laid-Open Nos. 11-298713, 2000-025278, 2003-091407, and the like).

On the other hand, upon creating a document using such integrated application, various data can be laid out using a print preview function or the like in the state of data without any actual print process. Using such function, required labor can be reduced compared to a case wherein a document is created by manually combining printouts.

However, upon adding headers/footers including page numbers and the like to document pages using such conventional integrated application, only fixed print positions (e.g., "left", "center", "right", and the like) of respective pages for the whole document can be selected. For this reason, in a dual-sided print mode or booklet print mode that requires staple, if the user designates to assign page numbers to "right" (or "left") for all pages, the page numbers are assigned to some pages on the binding margin side. For this reason, even when the user wants to assign page numbers to respective pages on the outer side with respect to the binding position, the aforementioned setup cannot dynamically change the assigned positions of page numbers on the obverse and reverse faces. As a result, a desired print result cannot be obtained.

The header/footer (page number) assignment function of a printer driver similarly encounters such problems, and cannot dynamically assign page numbers in consideration of the binding position or open direction.

SUMMARY OF THE INVENTION

The present invention has been made in consideration of the aforementioned prior arts, and has as its object to provide a convenient information processing apparatus and method, and a print control program, which allow a setup to dynamically change print positions of headers/footers (additional information) in correspondence with a change in print setup such as a staple setup, binding position, single-sided/dual-sided/booklet print modes, and the like, can switch between a setup that adds additional information to respective pages at a fixed position, and a setup that adds additional information at dynamic positions for respective pages. More preferably, a UI used to set the headers/footers is dynamically switched in correspondence with the print setup. It is, therefore, an object of the present invention to allow the user to realize his or her ideal setup without any labor of fine setups.

In order to achieve the above objects, an information processing apparatus of the present invention comprises the following arrangement.

An information processing apparatus for adding additional information to each page of a document, comprises:

print setup means for setting a binding position for a document;

additional information setup means for setting a position of additional information to be added to each page of the document; and rendering means for rendering the additional information at an appropriate position on the basis of the position set by the additional information setup means, wherein when the additional information setup means sets a relative position to a binding position, a rendering position of the additional information is determined for each page in accordance with the set relative position and the binding position set by the print setup means.

More preferably, the apparatus further comprises rendering position determination means for determining the rendering position of the additional information on the basis of the position set by the additional information setup means, and the rendering means renders the additional information at the rendering position determined by the rendering position determination means.

More preferably, the additional information setup means relatively sets a position on an inner or outer side with respect to the binding position while the document is bound, and the rendering means converts the relatively set position into a position in a page for each page, and renders the additional information.

More preferably, the print setup means makes a setup of a print face for a print sheet, the additional information setup means comprises display control means for displaying a window used to set the position of the additional information to be added to each page of the document, and the display control means switches windows to be displayed depending on whether the position of the additional information is set as a relative position or a fixed position, in accordance with the setup of the print setup means.

More preferably, a setup that requires to bind the document by the print setup means includes a staple setup and booklet print setup.

More preferably, when a setup that requires to bind the document is not made by the print setup means, the display control means sets a position in a page common to respective pages.

More preferably, when a setup for printing on a single face is made as the setup of the print face for the print sheet by the print setup means, the display control means sets a position in a page common to respective pages.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 4A and 4B are tables showing an example of a book property according to the embodiment of the present invention;

FIG. 5 is a table showing an example of a chapter property according to the embodiment of the present invention;

FIG. 6 is a table showing an example of a page property according to the embodiment of the present invention;

FIG. 25 shows an example of preview display of document pages when a setup is made to insert page numbers according to the embodiment of the present invention;

DETAILED DESCRIPTION OF THE PREFERRED EMBODIMENTS

Preferred embodiments of the present invention will now be described in detail in accordance with the accompanying drawings.

<Overview of Document Processing System of this Embodiment>

An overview of a document processing system according to the first embodiment of the present invention will be described below with reference to FIGS. 1 to 13. In this document processing system, a data file created by a general application is converted into a save file by a print data save driver. A print control application provides a function of editing that digital document file. For the save file that has been edited by the print control application, an edit information file is generated and saved in correspondence with the save file. The contents of the save file are read out by a print application (also called a despooler) via the print control application, and are printed. In this embodiment, in order to clarify respective functions, the general application, print data save driver, print control application, and print application are independently provided. However, a package to be provided to the user is not limited to such applications, and may be provided as an application or graphic engine that combines these applications. Details of these applications will be described later. Note that the print control program of the present invention has a function of dynamically assigning additional information (to be described later) to respective pages, and corresponds to a print control program which comprises that function: a print control application 104 (including a print application 105) or printer driver 106 in this embodiment.

<Hardware Arrangement Example of Document Processing System of this Embodiment>

Figure 2:
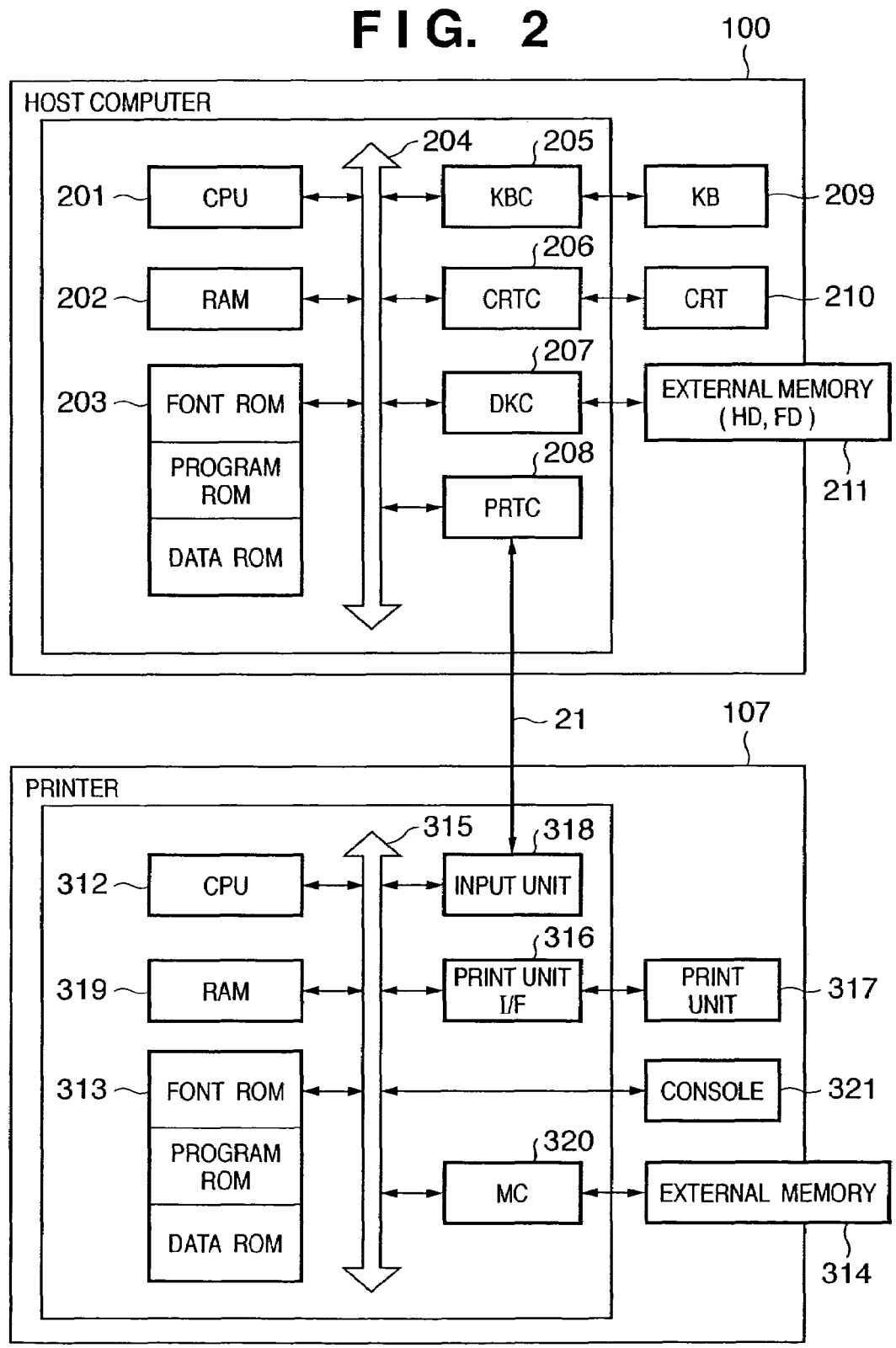
FIG. 2 is a block diagram for explaining the arrangements of a host computer and printer in the document processing system according to the embodiment of the present invention.

FIG. 2 is a block diagram for explaining the arrangement of the document processing system of this embodiment. Note that the present invention can be applied to any of a standalone apparatus, a system including a plurality of apparatuses, and a system which connects apparatuses via a network such as a LAN, WAN, or the like to execute processes, as long as the functions of the present invention are implemented.

Referring to FIG. 2, a host computer 100 comprises a CPU 201, RAM 202, ROM 203, and the like. The CPU 201 executes a document process including graphic data, image data, text data, and table data (including spreadsheet data or the like) together on the basis of a document processing program stored in a program ROM area of the ROM 203 or an external memory 211. The CPU 201 systematically controls devices connected to a system bus 204. The program ROM area of the ROM 203 or the external memory 211 stores an operating system program (to be referred to as an OS hereinafter) and the like as a control program of the CPU 201. A font ROM area of the ROM 203 or the external memory 211 stores font data and the like used in the document process. A data ROM area of the ROM 203 or the external memory 211 stores various data used upon executing the document process and the like. The RAM 202 serves as a main memory, work area, and the like of the CPU 201.

A keyboard controller (KBC) 205 controls key inputs from a keyboard 209 and a pointing device (not shown). A CRT controller (CRTC) 206 controls display on a CRT display (CRT) 210. A disk controller (DKC) 207 controls access to the external memory 211 such as a hard disk (HD), floppy® disk (FD), and the like. The external memory 211 stores a boot program, various applications, font data, user files, edit files, a printer control command generation program (to be referred to as a printer driver hereinafter), and the like. A printer controller (PRTC) 208 is connected to a printer 107 via a two-way interface 21, and executes a communication control process with the printer 107.

Note that the CPU 201 executes an outline font rasterize process onto a display information RAM assured on, e.g., the RAM 202, thus allowing WYSIWYG on the CRT 210. Also, the CPU 201 opens various registered windows on the basis of commands designated by a mouse cursor (not shown) or the like on the CRT 210, and executes various data processes. Upon executing a print process, the user opens a window that pertains to print setups, and can make setups of a print process method for the printer driver, which includes printer setups and print mode selection.

The printer 107 is controlled by a CPU 312. The CPU 312 outputs an image signal as output information to a print unit (printer engine) 317 connected to a system bus 315 on the basis of a control program and the like stored in a program ROM area of a ROM 313 or a control program and the like stored in an external memory 314. The program ROM area of the ROM 313 stores a control program and the like of the CPU 312. A font ROM area of the ROM 313 stores font data and the like used upon generating the output information. A data ROM area of the ROM 313 stores information and the like used on the host computer in case of a printer which does not have any external memory 314 such as a hard disk or the like.

The CPU 312 can execute a communication process with the host computer via an input unit 318, and can inform the host computer 100 of information in the printer and the like. A RAM 319 serves as a main memory, work area, and the like of the CPU 312, and its memory size can be expanded by an option RAM connected to an expansion port (not shown). Note that the RAM 319 is used as an output information rasterize area, environment data storage area, NVRAM, and the like. A memory controller (MC) 320 controls access to the external memory 314 such as a hard disk (HD), IC card, or the like. The external memory 314 is connected as an option, and stores font data, an emulation program, form data, and the like. Reference numeral 321 denotes a control panel on which operation switches, LED indicators, and the like are arranged.

The number of external memories 314 is not limited to one, and a plurality of external memories 314 may be connected. That is, option cards and external memories that store programs used to interpret printer control languages of different language systems in addition to internal font data may be connected. Furthermore, an NVRAM (not shown) may be connected, and may store printer mode setup information from the control panel 318.

<Software Configuration Example of Document Processing System of this Embodiment>

Figure 1:
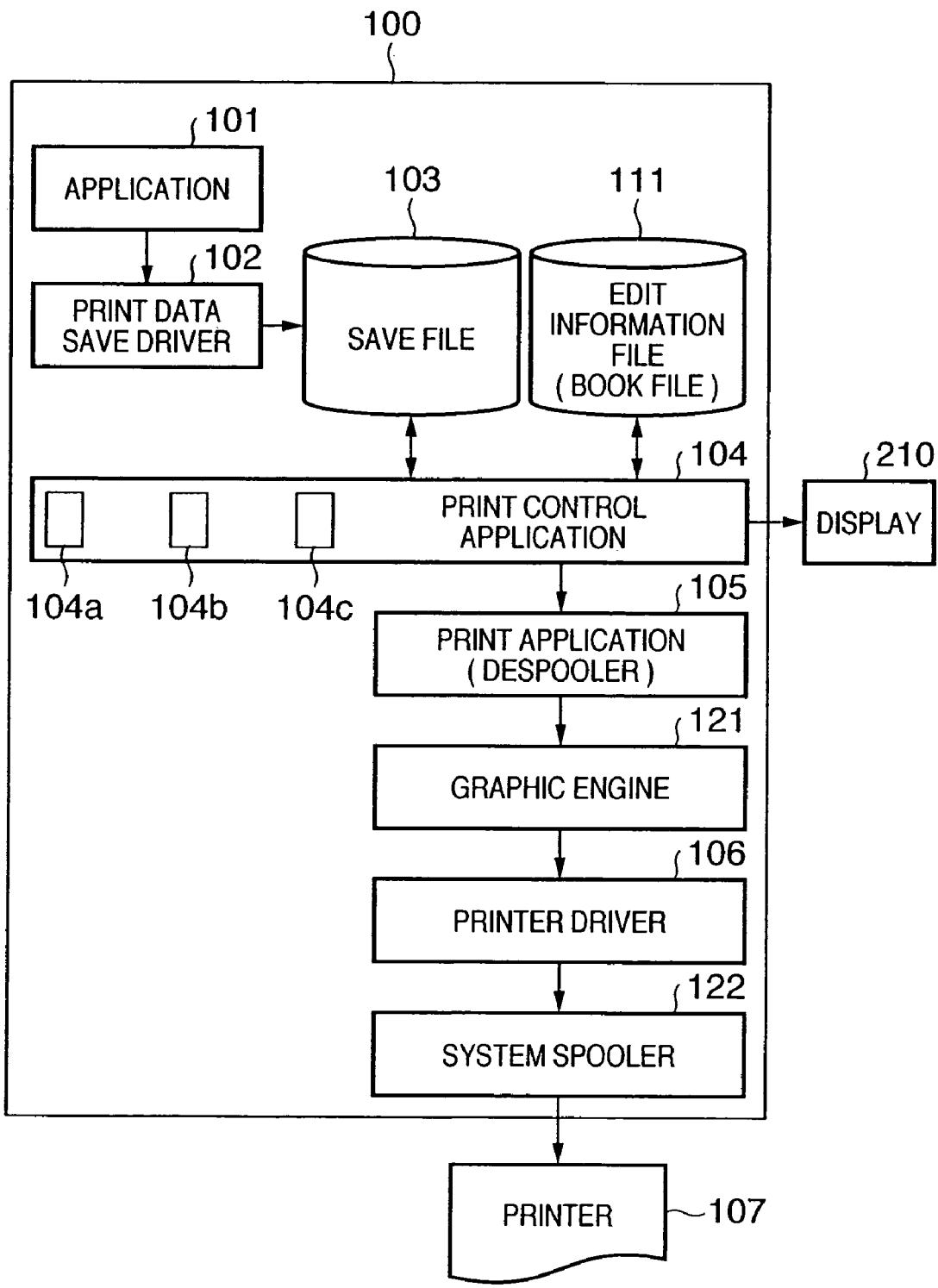
FIG. 1 is a block diagram for explaining the arrangement of a standalone document processing system according to an embodiment of the present invention.

FIG. 1 shows the software configuration of the document processing system of this embodiment.

The document processing system is implemented by a digital computer 100 (to be also referred to as a host computer hereinafter) as a preferred embodiment of a document processing apparatus (information processing apparatus) of the present invention. A general application 101 corresponds to application programs that provide functions such as wordprocessing, spreadsheet, photo retouch, draw or paint, presentation, text edit, and the like, and has a function of requesting an operating system (OS) to execute a print process. These applications use a predetermined interface provided by the OS upon printing created application data such as document data, image data, and the like. That is, the application 101 sends an output command in a predetermined format to an output module of the OS that provides the interface. Upon reception of the output command, the output module converts that command into a format which can be processed by an output device such as a printer or the like, and outputs the converted command. Since the format that can be processed by an output device differs depending on the types, manufacturers, models, and the like of devices, device drivers are provided for respective devices. The OS converts the command using that device driver to generate print data, and bundles print data using a JL (Job Language), thus generating a print job.

When the Microsoft Windows® is used as the OS, a module called GDI (Graphic Device Interface) is used as the output module. The application 101 calls a GDI function using the created data as parameters in a GDI compatible format. As a result, the aforementioned output command is sent to the OS.

A print data save driver 102 is a software module which is prepared by improving the aforementioned device driver, and is provided to implement this document processing system. The print data save driver 102 is not designed for any specific output device, and converts an output command into a format that can be processed by a print control application 104 and printer driver 106 (to be described later). The format after conversion by this print data save driver 102 (to be referred to as a "save file format" hereinafter) is not particularly limited as long as it can express a document structure or an original for each page in a detailed format. As a format of expressing a document for each page, a PDF format available from Adobe Systems Corporation, an SVG format, and the like can be adopted as a save file.

In this embodiment, a save file 103 and edit information file 111 are independent files. However, these files may be integrated as an archive file so as to maintain consistency before these files are opened.

The system shown in FIG. 1 can process the contents of data saved in the save file 103. As a result, functions that cannot be provided by the application such as an enlargement/reduction function, a function of printing a plurality of pages on one page in a reduced scale, and the like, can be implemented for print data from the application. To this end, the system of FIG. 1 is expanded from the conventional one to spool print data as intermediate code data. In order to process print data, the user normally makes setups from a window provided by the print control application 104, and the setup contents are saved on the RAM 202 or external memory 211.

As shown in FIG. 1, in this expanded processing system, print data from the application 101 is saved on the system as a save file 103 via the print data save driver 102. This save file 103 is also called an intermediate file, and includes contents data of printouts, print setup data, and the like. The contents data of printouts is data obtained by converting data which is created by the user on the application into intermediate code data. The print setup data is data that describes how to output the contents data (output style and the like). In addition, the save file 103 includes application expanded data called an edit information file, which is used to provide a user interface upon prompting the user to edit the contents of the save file and issue its output command via the print control application.

The print control application 104 loads this save file 103. The print control application 104 can change, display, save, and print the output style of the loaded save file 103. The print application (despooler) 105 executes an actual print process. Upon reception of a print command from the print control application 104, the print application (despooler) 105 inputs data to a graphic engine 121 in a predetermined format (e.g., a GDI function or the like). The graphic engine 121 converts the input data in the GDI function format or the like into a DDI function, and outputs that DDI function to the printer driver 106. The printer driver 106 generates a printer control command in, e.g., a page description language on the basis of the DDI function acquired from the graphic engine 121, and outputs that command to the printer 107 via a system spooler 122.

The print control application 104 includes procedures shown in FIGS. 20 to 24 and FIG. 28. These procedures correspond to print setup means 104a, additional information setting means 104b, and rendering means 104c. In this embodiment, these means are implemented by software but may be implemented by hardware circuits.

<Data Format Example of Save File>

Prior to a detailed description of the print control application 104, the data format of the save file will be explained. The save file includes data of respective original pages (data for respective pages generated by the application; also called logical pages) as contents data, and data in a format called job ticket as print setup data. Furthermore, an edit information file used to allow the print control application (to be described later) to change the setups of print setup information included in the save file is also stored together with the save file. In the save file, original page data in the PDF format, and data in the format called job ticket are intermediate data.

In the save file, each original page data is defined in, e.g., the PDF format or the like, and includes information of designation of a font and color of text data, layout positions of text data, graphic data, and the like in an original page, and the like.

The job ticket as the save file is data having a structure which is defined by an original page as a minimum unit. The job ticket structure defines the layout of an original page on a paper sheet. One job ticket corresponds to one print job. The job ticket structure includes a node for the overall document as the uppermost node, which defines the properties of the overall document (e.g., a dual-sided/single-sided print mode or the like). Below that node, information indicating a document structure and setups for respective elements is included. More specifically, sheet bundle nodes belong to that uppermost node, and include the identifiers of paper sheets to be used, and properties such as designation of a sheet feed port in the printer, and the like. Sheet nodes which are included in that sheet bundle belong to each sheet bundle node. One sheet corresponds to one paper sheet. Print page (physical page) nodes belong to each sheet node. In the single-sided print mode, one physical page node belongs to one sheet node. In the dual-sided print mode, two physical page nodes belong to one sheet node. Original page nodes which are to be laid out on one physical page belong to each physical page node. As the properties of a physical page, the layout of original pages is included. Each original page node includes link information to original page data as an entity of an original page.

Figure 12:
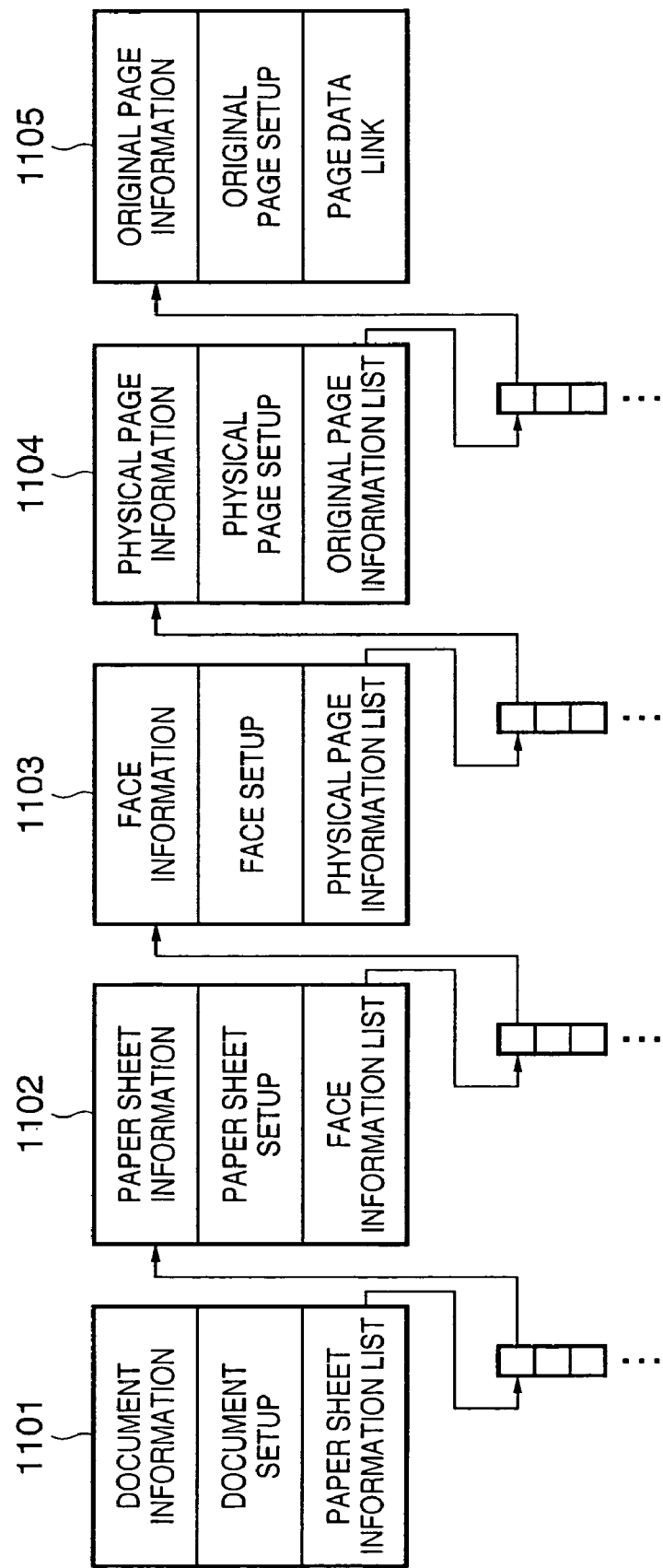
FIG. 12 shows an example of a job ticket structure.

FIG. 12 shows an example of the data structure of the job ticket. In print data, a document includes a set of paper sheets, and each paper sheet has two faces, i.e., obverse and reverse faces, each face has a region (physical page) on which an original or originals are to be laid out, and each physical page has a set of original pages as minimum units. Reference numeral 1101 denotes data corresponding to a document, which includes data associated with the overall document, and a paper sheet information list of paper sheets which form the document. Paper sheet information 1102 includes information associated with each paper sheet such as a paper size, and the like, and a face information list of faces to be laid out on each paper sheet. Face information 1103 includes data unique to each face, and a physical page list of physical pages to be laid out on each face. Physical page information 1104 includes additional information such as a physical page size, header/footer, and the like and an original page list of original pages which form a physical page.

The setup information for the overall document includes, e.g., the following information:

(1) information of the layout positions and order of original pages on a physical page (indicating a face of a sheet of a print medium) (e.g., so-called N-up print for laying out N pages on a single physical page);

(2) a document name;

(3) availability of dual-sided designation;

(4) availability of a variable print function (a technique for inserting separately prepared data as the contents of predetermined fields upon printing);

(5) the number of original pages included;

(6) a color type;

(7) the number of copies and the like;

(8) watermark (a background pattern to be superposed on an original page or print page);

(9) printer status;

(10) a media type;

(11) a logical page number list on a sheet;

(12) print quality, and the like.

As for the print setups for each sheet bundle, the following parameters can be set:

(13) designation of N-up print;

(14) a color type;

(15) a paper source, and the like.

As for the print setups for each sheet which belongs to the sheet bundle, the following setup can be made:

(16) a setup of a dual-sided/single-sided print mode.

As for the print setups for each physical page (face) which belongs to each sheet, the following setups can be made:

(17) a color type; and

(18) designation of an obverse/reverse face;

As for the print setups for each original page to be laid out on each physical page, the following setups can be made:

(19) a start coordinate position;

(20) a size; and

(21) an order.

As described above, the job ticket is data having a hierarchical structure including original pages as minimum units. Most of print setups defined by such job tickets are common to each layer set for each document, but some setups such as an N-up setup, color type, and the like are common to respective layers. As for common setups, each lower layer inherits identical setup values in its upper layer in principle. When a given property common to respective layers has different values, a value set for the layer of interest is used as the value of that property. For example, the color type can be set for the entire document, each sheet bundle (bundle of sheets), and each physical page (also called a face or print page). The color type is a setup that designates a mode in the printer. Print data is generated to control the printer in a monochrome mode if the monochrome mode is set, or to control the printer in a color mode if the color mode is set.

<Document Structure Managed by Edit Information File>

The print control application 104 is a program which provides a user interface that makes the user designate data included in the save file by various methods, or change print setups. The save file itself has the aforementioned structure, and the print control application 104 manages the aforementioned edit information file in correspondence with the save file so as to manage the save file. The print control application 104 manages documents using a management structure independent from the save file, e.g., a document defined by a job ticket, on the basis of edit information included in that edit information file. This management structure is a hierarchical structure which is similar to that of the job ticket, but has "book", "chapter", and "original (logical) page" layers in turn from the above unlike the job ticket. Of these layers, the "original page" layer indicates an original page in the job ticket. The "chapter" layer corresponds to a sheet bundle (bundle of sheets).

A virtual file displayed as a user interface is not a file which is permanently saved and managed unlike the save file 103, but is temporarily formed for the user interface when the user changes the print setups of the save file or issues a print instruction using the print control application 104. Therefore, the print control application 104 opens the save file 103 together with the corresponding edit information file 111, forms a virtual book file having a structure defined by the edit structure on the basis of the save file, and displays it as a user interface, as will be described later. When the user changes the print setups with reference to the book file via the user interface, these setups are reflected on the edit information file.

<Format Example of Edit Information File>

Prior to a detailed description of the print control application 104, the data format of a book file, i.e., edit information file will be explained. The book file has a hierarchical structure of three layers, which imitates a book of paper media. The uppermost layer is called "book", which imitates one book, and defines properties associated with the overall book. The intermediate layer corresponds to a chapter in the book, and is called "chapter". Properties can also be defined for each chapter. The lowermost layer is "page", which corresponds to each page defined by the application program. Properties can also be defined for each page. One book can include a plurality of chapters, each of which can include a plurality of pages.

Figure 3:
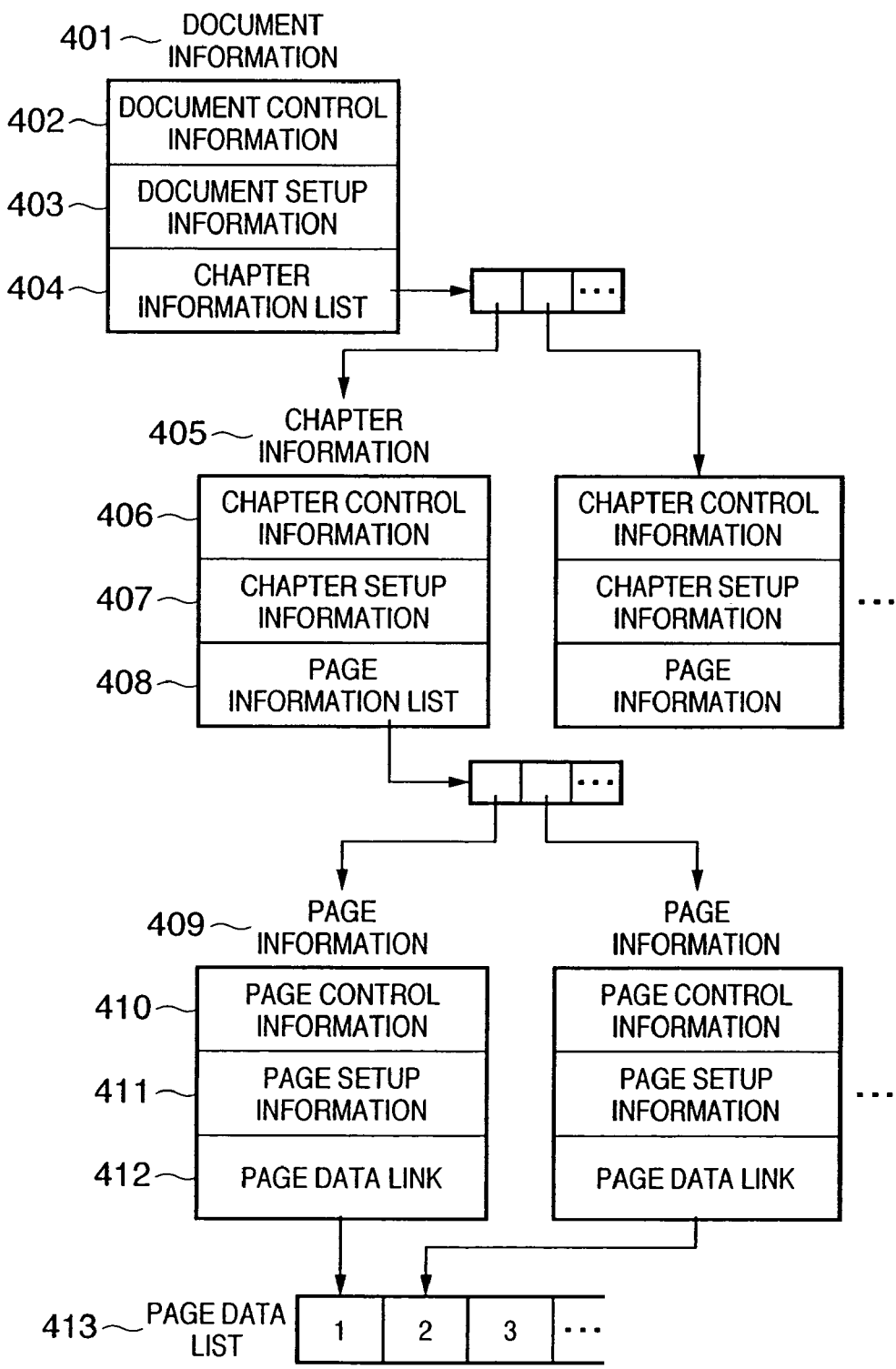
FIG. 3 shows an example of a book file structure according to the embodiment of the present invention.

FIG. 3 illustrates an example of the book file format. A book, chapter, and page in the book file of this example are respectively indicated by corresponding nodes. One book file includes one book. The book and each chapter are concepts used to define a structure as the book, and include defined property values and links to lower layers as their entities. An entity of each page is original page data in, e.g., the PDF format, which is included in the save file 103. That is, the edit information file defines the format and properties of a book file, but does not include original page data themselves. Each page has, as its entity, data for each page output by the application program. For this reason, the page includes an entity of an original page (original page data) and a link to the original page data. Note that a print page upon printing on a paper medium or the like includes a plurality of original pages in some cases. This structure is displayed not as links but as properties in the book, chapter, and page layers.

In FIG. 3, since a book file need not always be one complete book, "book" is generally described as "document". Information associated with a document, information associated with a chapter, and information associated with a page will be generally referred to as document information, chapter information, and page information hereinafter, respectively.

In FIG. 3, the book file structure as document information 401 as the uppermost node. The document information 401 can be roughly classified into three parts 402 to 404. Document control information 402 holds information such as the path name of a document file in the file system and the like. Document setup information 403 holds layout information such as a page layout and the like, and function setup information of the printer such as a staple function and the like, and corresponds to a book property. A chapter information list 404 holds a set of chapters which form a document in the form of a list. The list holds chapter information 405.

The chapter information 405 is also roughly classified into three parts 406 to 408. Chapter control information 406 holds information such as a chapter name and the like. Chapter setup information 407 holds information of a page layout and staple unique to that chapter, and corresponds to a chapter property. Since each chapter has setup information, a document which has complicated layouts (e.g., a 2UP layout for the first chapter, and a 4UP layout for other chapters) can be created. A page information list 408 holds a set of original pages which form each chapter in the form of a list. The page information list 408 holds page information data 409.

The page information data 409 is also roughly classified into three parts 410 to 412. Page control information 410 holds information such as a page number and the like to be displayed on a tree. Page setup information 411 holds information such as a page rotation angle, page layout position information, and the like, and corresponds to properties of an original page. Page link information 412 is original data corresponding to a page. In this example, the page information 409 has only the link information 412 in place of original data itself, and actual original data is held by a page data list 413.

FIGS. 4A and 4B are tables showing a list of an example of a book property (document setup information 403). Normally, as for items that can be defined redundantly with lower layers, the property values of lower layers are preferentially adopted. For this reason, as for items included in only a book property, values defined for the book property are valid throughout the book. However, as for items redundant to lower layers, their values are used as prescribed values if they are not defined in lower layers. In this example, whether or not property values of lower layers are preferentially used can be selected. Note that some of items shown in FIGS. 4A and 4B do not practically correspond to one item but include a plurality of related items.

There are six items unique to the book property: print method, booklet detail, front cover/back cover, index sheet, inserting sheet, and chapter division. These items are set throughout "book". As the print method property, three values: single-sided print, dual-sided print, and booklet print can be set. The booklet print is a method of printing to allow bookbinding by folding a bundle of a separately designated number of sheets into two, and binding that bundle. As the booklet detail property, an opening direction, the number of sheets that form a bundle, and the like can be designated when the booklet print mode is designated.

The front cover/back cover property includes designation to add paper sheets used as front and back covers, and designation of print contents on the added paper sheets upon printing the save file combined as a book. The index sheet property includes designation of insertion of index sheets with tabs, which are separately prepared in the printer, as divisions of chapters, and designation of print contents on index (tab) portions. This property is valid when the printer used comprises an inserter having an insert function of inserting paper sheets prepared independently of print paper sheets at desired positions, or when a plurality of paper feed cassettes can be used. The same applies to the inserting sheet property.

The inserting sheet property includes designation of insertion of paper sheets to be supplied from an inserter or paper feed cassette as divisions of chapters, and designation of a supply source when inserting sheets are to be inserted.

The chapter division property includes designation as to whether a new paper sheet is used, a new print page is used, nothing special is done, or the like at a division of a chapter. In the single-sided print mode, use of a new paper sheet has the same meaning as use of a new print page. In the dual-sided print mode, if "use of new paper sheet" is designated, successive chapters are never printed on a single sheet; if "use of new print page", successive chapters may be printed on the obverse and reverse faces of a single paper sheet.

FIG. 5 shows an example of a list of a chapter property (chapter setup information 407) and FIG. 6 shows an example of a list of a page property (page setup information 411). The relationship between the chapter and page properties is the same as that between the book property and those of lower layers.

Items of the chapter property are not unique to a chapter, and all items overlap those of the book property. Therefore, normally, if definitions in the chapter property are different from those in the book property, values defined in the chapter property are preferentially used. However, in this embodiment, whether or not the property values of lower layers are to be preferentially used can be selected, as will be described later.

There are file items common to only the book and chapter properties: paper size, paper direction, N-up print designation, enlargement/reduction, and exhaust method. Of these items, the N-up print designation property is an item used to designate the number of original pages included in one print page. Layouts that can be designated include 1×1, 1×2, 2×2, 3×3, 4×4, and the like. The exhaust method property is an item used to designate whether or not a staple process is applied to exhausted paper sheets, and the validity of this property depends on whether or not the printer used has a staple function.

Items unique to the page property are: a page rotation property, zoom, layout designation, annotation, page division, and the like. The page rotation property is an item used to designate the rotation angle upon laying out original pages on a print page. The zoom property is an item used to designate a zoom ratio of an original page. The zoom ratio is designated while the size of a virtual logical page region is defined as 100%. The virtual logical page region is a region occupied by one original page, when original pages are laid out according to designation of N-up or the like. For example, in case of 1×1, the virtual logical page region corresponds to one print page; in case of 1×2, it corresponds to a region obtained by reducing the respective side of one print page to about 70%.

Properties common to "book", "chapter", and "page" are a watermark property and header/footer property (additional information property). A watermark is an independently designated image, character string, or the like, which are printed to be superposed on data created by the application. A header/footer is a watermark which is printed at fixed positions of top and bottom margins of each page, or a watermark which is printed at different positions on the obverse and reverse faces. Note that items which can be designated by variables (e.g., a page number, date, and the like) are prepared for the header/footer. Details of the contents that can be designated in the watermark and header/footer properties can be set in the book, chapter, and page properties in this embodiment. That is, a page number is designated to be added at a dynamic position on the outer side in Arabic numerals in the book property, and a page number can be designated to be added at a fixed position on the right side in Roman numerals in the chapter or page property. In this manner, the user can designate desired contents and layout position of additional information.

Note that the present invention is not limited to such specific contents. The contents that can be designated in the watermark and header/footer properties may be common in the chapter and page properties, but may be different in the book property. The book property, i.e., the document setup information 403 may be allowed to set the contents of a watermark and header/footer (the type of watermark and the page number format as the header/footer), and to designate how to print the watermark and header/footer throughout the book (designation of fixed or dynamic position), while the chapter and page properties may be allowed to designate whether or not the watermark and header/footer designated in the book property are to be printed.

<Operation Sequence Example of Document Processing System of this Embodiment>

Figure 7:
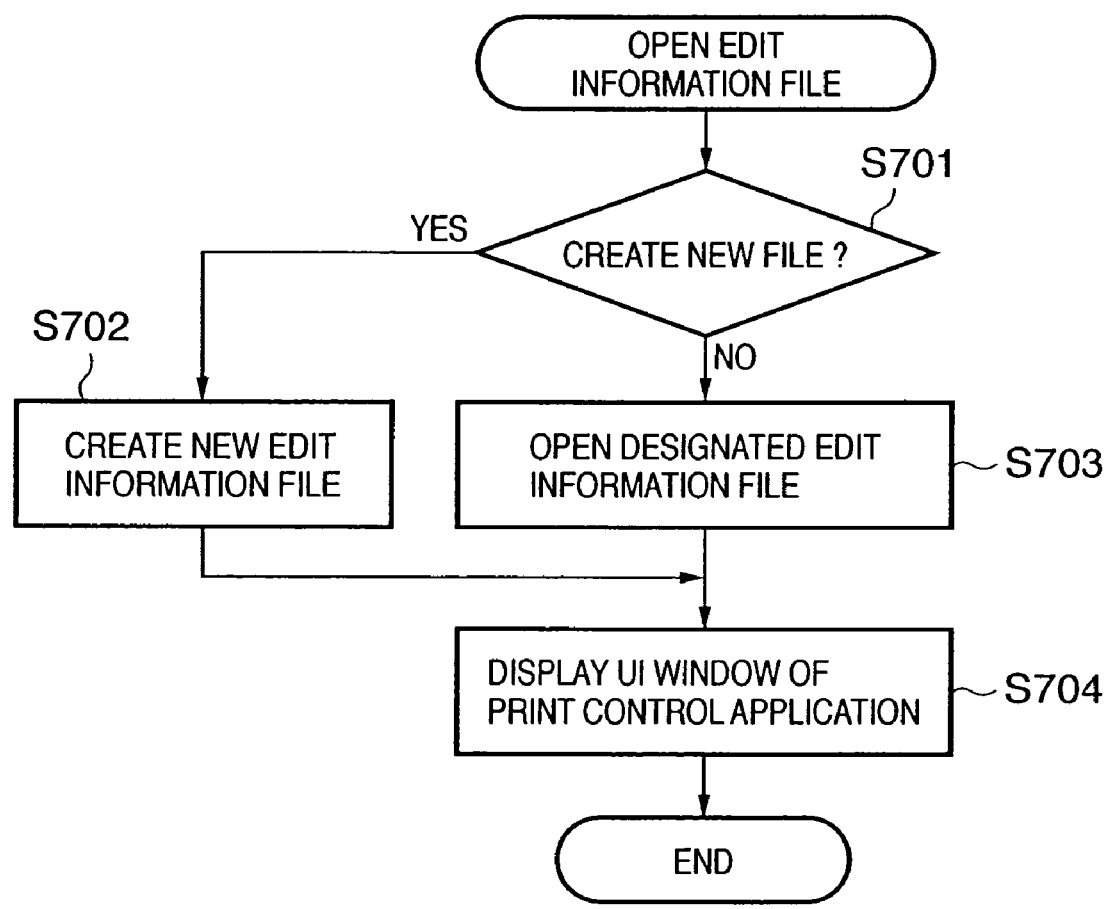
FIG. 7 is a flowchart for explaining a sequence for opening a book file according to the embodiment of the present invention.

The edit information file has the aforementioned structure and contents. The sequence for creating the edit information file 111 and save file 103 by the print control application 104 and print data save driver 102 will be described below. Creation of the edit information file 111 is implemented as part of the edit operation of the edit information file 111 by the print control application 104. FIG. 7 is a flowchart showing the sequence upon opening the edit information file 111 by the print control application 104.

Figure 8:
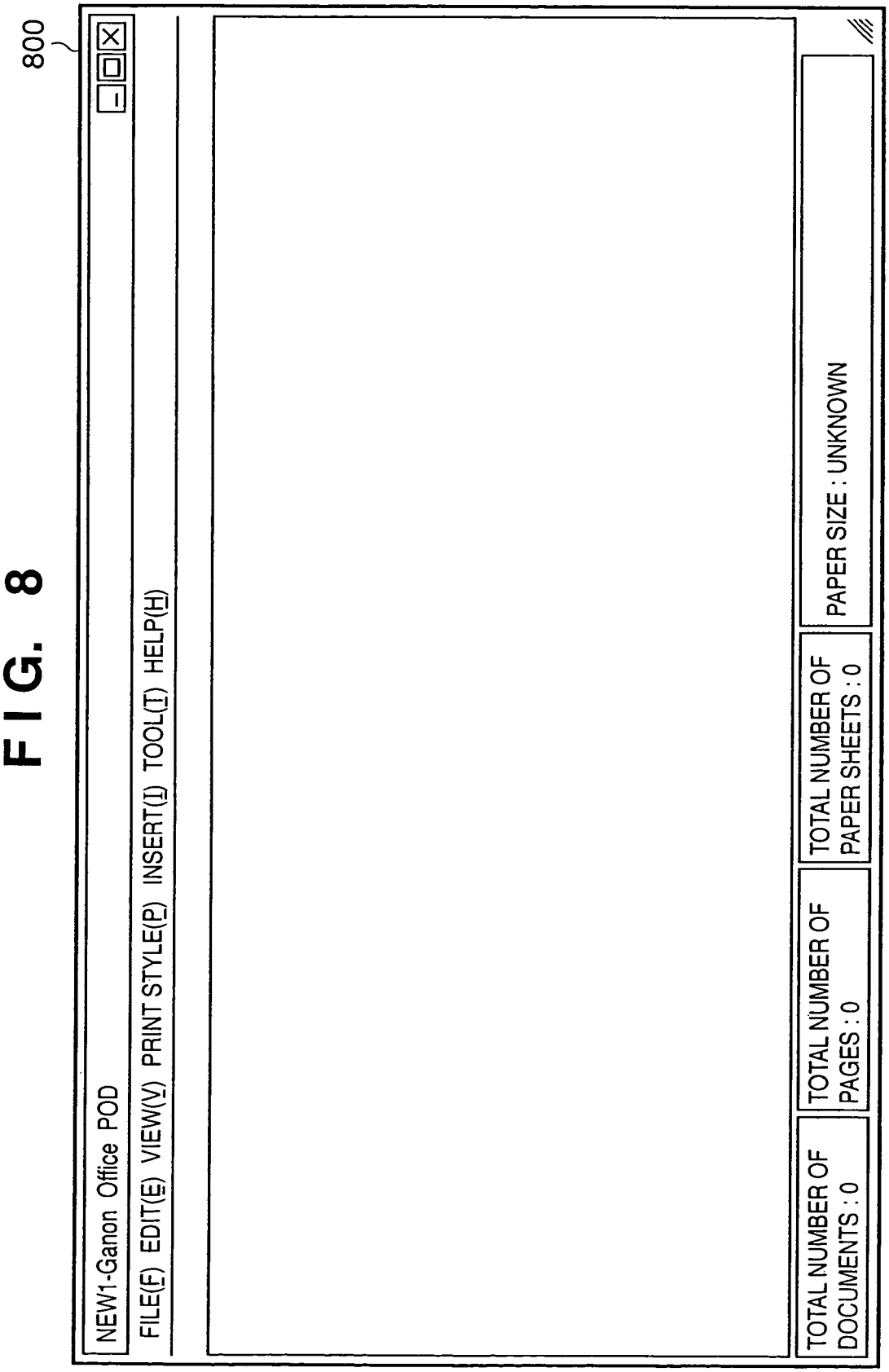
FIG. 8 shows an example of a user interface window upon opening a new book file.

It is checked if an edit information file to be opened is a new file to be created or an existing file (step S701). If a new file is to be created, a new edit information file which does not include any chapters is created (step S702). The new edit information file to be created corresponds to a node of a book which includes no chapter node that links to the chapter information list 404 in the example of FIG. 3. As the book property, a set of property values which is prepared in advance for a new file are applied. Then, a user interface (UI) window used to edit the new edit information file is displayed (step S704). FIG. 8 shows an example of the UI window upon creating a new book file. In this case, since the book file does not have any substantial contents, nothing is displayed on a UI window 800.

Figure 9:
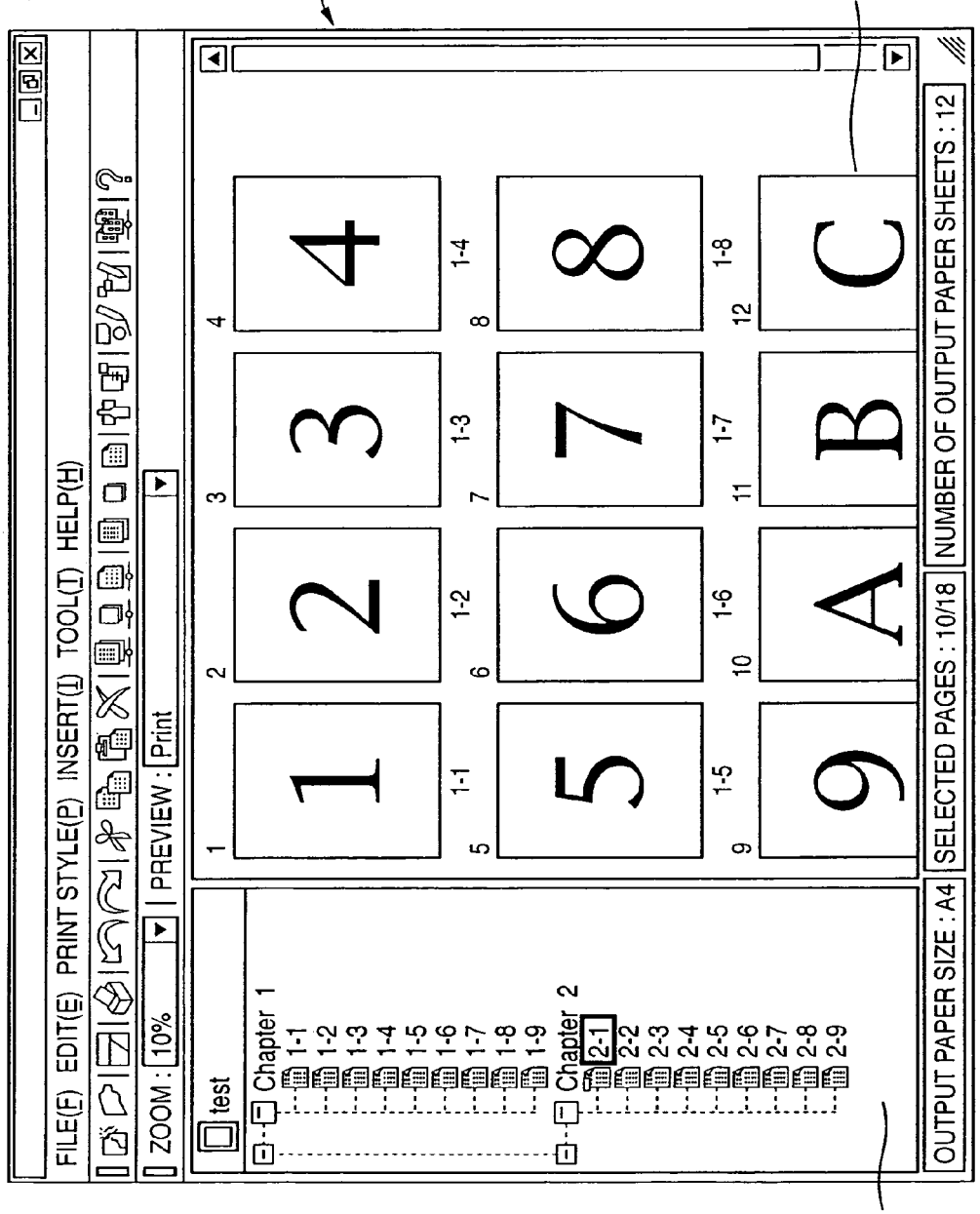
FIG. 9 shows an example of a user interface window upon opening an existing book file.

On the other hand, if an existing edit information file is to be opened, the designated edit information file is opened (step S704), and data are developed according to the structure, properties, and contents of that edit information file, thus displaying a user interface (UI) window. FIG. 9 shows an example of this UI window. A UI window 900 includes a tree area 901 that presents the book structure, and a preview area 902 that displays previews of printed states of pages. The tree area 901 displays chapters included in a book and pages included in each chapter, so that the tree structure shown in FIG. 3 can be understood. Pages displayed on the tree area 901 are original pages. The preview area 902 displays the contents of print pages in a reduced scale. The display order of the pages reflects the book structure. Note that data mapped on the RAM 102 have the same configuration as that in FIG. 3. Properties included in nodes of respective layers are mapped on the RAM 102 in the formats shown in FIGS. 4A to 6. The structure of these property items is implemented using pointers and the like, and items in properties can be identified by identifiers and the like for respective items.

Figure 10:
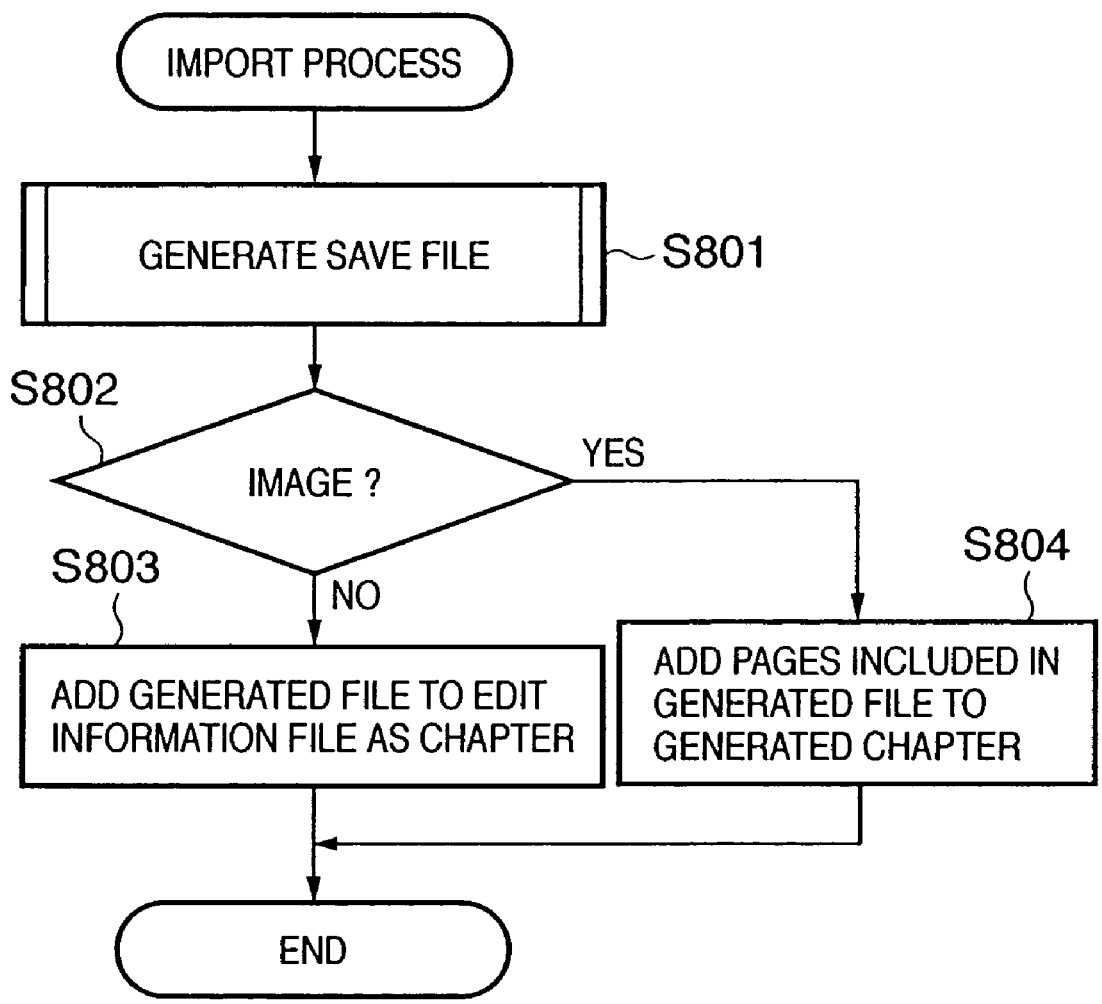
FIG. 10 is a flowchart for explaining a sequence for importing a saved file to a book file according to the embodiment of the present invention.

The print data save driver 102 can add original page data to the opened edit information file as a new chapter. This function is called an import function. By importing application data to the new edit information file created in the sequence shown in FIG. 7, original page data are associated with those which belong to a given chapter of the edit information file, and an entity is given to the edit information file. This function is launched by dragging & dropping application data on the window of FIG. 8. FIG. 10 shows the sequence of the import process.

Referring to FIG. 10, the user launches an application program used to generate designated application data, and operates it to print out application data while designating the print data save driver 102 as a device driver, thus converting the application data into data of an intermediate format (e.g., PDF format) (step S801). Upon completion of conversion, it is checked if the converted data is image data (step S802). This checking process can be attained based on a file extension of application data if the application is running under the Windows® OS. For example, if the extension is "bmp", it is determined that the converted data is Windows® bitmap data; if it is "jpg", jpeg-compressed image data; and if it is "tiff", tiff image data.

If the converted data is not image data, the intermediate data generated in step S801 is added to a book of the currently opened edit information file as a new chapter (step S803). That is, a new chapter and new original pages which belong to that chapter are added by the import function. Link information to an entity of an original page is written in each page node. As the entity of each original page, data generated by the print data save driver 102 is used.

When application data is imported, book property values which are common to chapter property values are copied, and other chapter property values are set as prescribed values which are prepared in advance. Also, properties common to those of the full document of the save file are inherited.

If the imported application data is image data, no new chapter is added in principle, and that image data is added to the designated chapter to have one file as one original page (step S804). However, if the edit information file is a new, empty file, a new chapter is created, and image data is added as an original page which belongs to that chapter. In this case, as page property values, which are common to those of the property of the upper layer, these property values are given. Also, as property values which are defined in the application data and are inherited by the save file, these values are given. For example, when N-up designation or the like is made in the application data, that property value is inherited. In this way, a new edit information file is created, or a new chapter is added.

Also, in the save file, if data generated by the print data save driver is data to be added to an existing save file, the added original page data is newly added and saved. In this case, if print setups designated by the application are reflected on the data generated by the print data save driver, such print setups can also be reflected on the save file.

Figure 11:
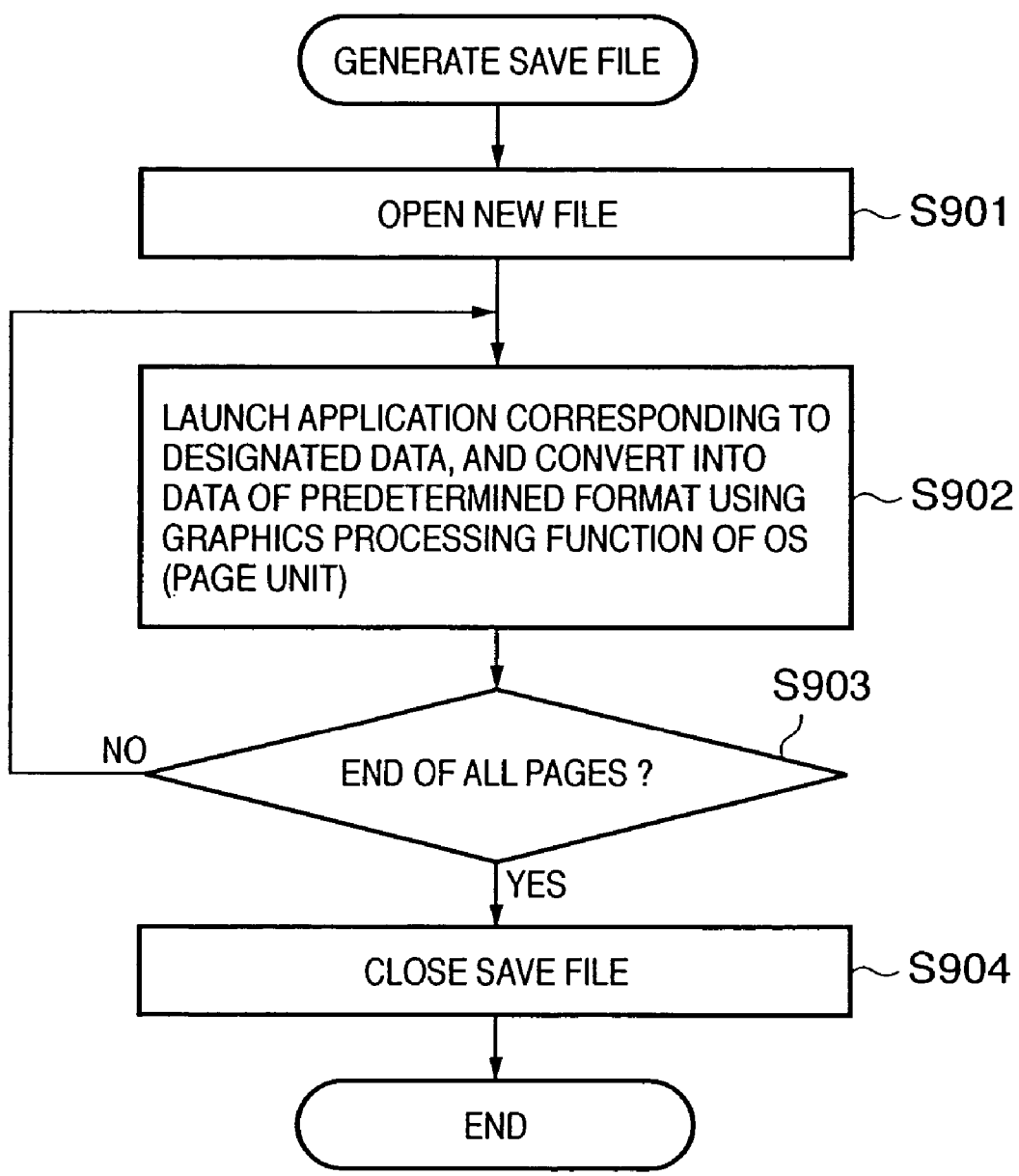
FIG. 11 is a flowchart for explaining a sequence for converting application data into a save file according to the embodiment of the present invention.

FIG. 11 is a flowchart showing the sequence for generating a save file by the print data save driver 102 in step S801 in FIG. 10. A new save file is created and opened (step S901). The user launches an application corresponding to designated application data, and operates that application to transmit an output command to an output module (e.g., Windows® GDI) of the OS using the print data save driver 102 as a device driver. The output module converts the received output command into data of a predetermined format (e.g., PDF format) by the print data save driver 102, and outputs the converted data (step S902). The output destination is the save file opened in step S901. It is checked if conversion of all designated data is complete (step S903). If conversion is complete, the save file is closed (step S904). The save file generated by the print data save driver 102 includes the structure shown in FIG. 12 and entities of original page data.

<Editing of Edit Information File>

In this way, the edit information file 111 and save file 103 can be created from application data. The generated edit information file 111 allows the following edit operations for chapters and pages.

(1) New addition
(2) Delete
(3) Copy
(4) Cut
(5) Paste
(6) Move
(7) Change chapter name
(8) Re-name page number
(9) Insert front cover
(10) Insert inserting sheet
(11) Insert index sheet
(12) Page layout for original pages In addition, an operation for undoing an edit operation that has already been done, and an operation for redoing an undo can be made. These edit functions allow edit operations such as integration of a plurality of edit information files, re-layout of chapters and pages in an edit information file, deletion of chapters and pages in an edit information file, layout change of original pages, insertion of inserting sheets or index sheets, and the like. When these operations are made, the operation results are reflected on the properties shown in FIGS. 4A to 6 or on the structure of the edit information file. For example, when the user makes a new addition operation of a blank page, a blank page is inserted at a designated position. When the user changes the layout of an original page, the change contents are reflected on the properties such as the print method, N-up print, front cover/back cover, index sheet, inserting sheet, and chapter division.

<Output of Edit Information File>

The final goal of the edit information file which is created/edited in this way is printout. When the user selects a file menu from the UI window 900 of the print control application shown in FIG. 9, and selects "print" from that menu, the edit information file is printed out by a designated output device. In this case, the print control application 104 generates data called a despool table on the basis of the currently opened edit information file and corresponding save file (e.g., job ticket), and passes that data to the print application 105.

The despool table includes the same structure as that of the source job ticket, print setups in respective layers, and links to original pages. That is, there are print setups valid for sheet bundles (bundles of sheets) such as N-up print designation and the like below those which are valid for the whole document such as the number of copies, color type, designation of dual-sided/single-sided print, and the like, print setups such as dual-sided/single-sided designation and the like for each sheet which belongs to each sheet bundle, and print setups such as designation of color type, obverse/reverse face, and the like for each physical page (face) which belongs to each sheet. The print setups of respective layers include items which can be set. The setups of the despool table are designated based on physical pages. The print application 105 converts the despool table into parameters to be passed to the graphic engine 121.

The print application 105 converts the save file 103 into an output command of the OS (e.g., a GDI command of Windows®), and calls a GDI function as a graphic engine using that command as parameters. The graphic engine 121 makes the designated printer driver 106 generate a command suited to a device (e.g., a printer), and transmits that command to the device.

The graphic engine 121 loads the printer driver 106 prepared for each print device from the external memory 211 onto the RAM 202, and sets the printer driver 106 as an output destination. The graphic engine 121 converts the GDI (Graphic Device Interface) function into a DDI (Device Driver Interface) function, and calls a DDI function provided by the printer driver 106. The printer driver 106 converts into a control command that the printer can interpret (e.g., PDL (Page Description Language)) on the basis of the DDI function called from the output module. The converted print control command is output to the printer 107 as print data via the system spooler 122 which is loaded onto the RAM 202 by the OS, and the interface 21.

(Example of Contents of Preview Display)

As described above, when a book file is opened by the print control application, the user interface window 900 shown in FIG. 9 is displayed. The tree area 901 displays a tree which indicates the structure of the opened book (to be referred to as "book of interest" hereinafter). On the preview area, three different display modes are prepared in accordance with the user's designation. The first mode is called an original view which displays original pages intact. In the original view mode, the contents of original pages which belong to the book of interest are displayed in a reduced scale. A layout is not reflected on the contents displayed on the preview area. The second mode is a print view mode. In the print view mode, the preview area 902 displays original pages that reflect their layout. The third mode is a simple print view mode. In the simple print view mode, the contents of original pages are not reflected on the contents displayed on the preview area, and only a layout is reflected.

<Arrangement Example of Another Document Processing System>

The document processing system of the aforementioned embodiment is a standalone system. Also, a server-client system as an expanded system of the standalone system can create and edit a book file in substantially the same arrangement and sequence. However, book files and print processes are managed by a server.

Figure 13:
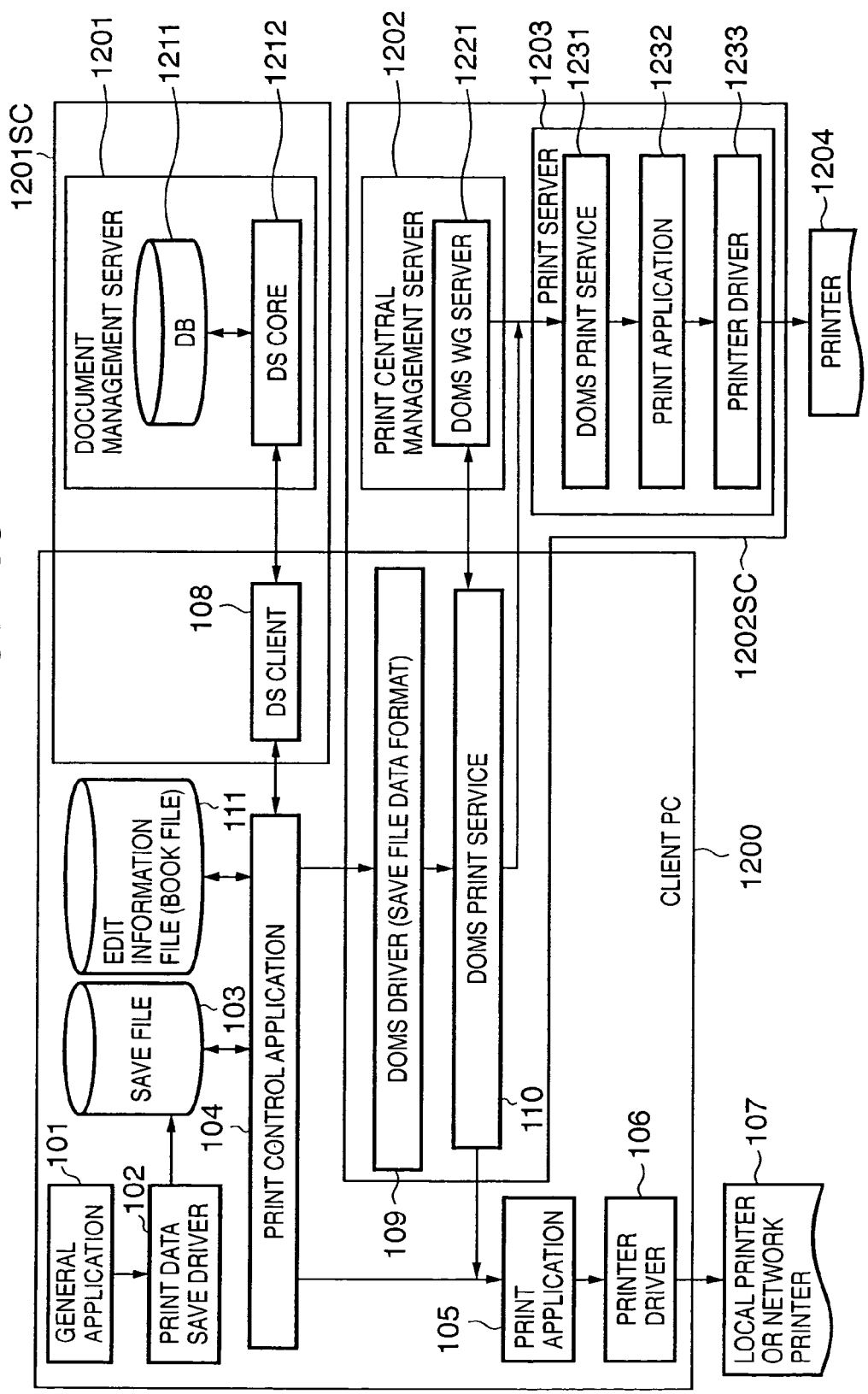
FIG. 13 is a block diagram showing the arrangement of a client-server document processing system according to the embodiment of the present invention.

FIG. 13 is a block diagram showing the arrangement of a server-client document processing system.

A client document processing system 1200 has an arrangement obtained by adding a DOMS (Document Output Management Service) driver 109, DOMS print service module 110, and DS (Document Service) client module 108 as client modules to the standalone system. A document management server 1201, print central management server 1202, and print server 1203 are connected to this client document processing system 1200. These servers are normally connected to the client document processing system via a network. However, when the servers also serve as clients at the same time, these servers are connected via inter-process communications that simulate network communications. In FIG. 13, both the document management server 1201 and print central management server 1202 are connected to the client, but only either of these servers may be present on the network. If the document management server alone is connected to the client, a document management server-client system 1201SC including its client modules is added to the standalone document management system. On the other hand, if the print central management server 1202 alone is connected to the client, a print management server-client system 1202SC including its client modules is added to the standalone document management system.

The document management server 1201 stores book files created/edited by the print control application 104. When book files are managed by the document management server 1201, they are saved in a database 1211 of the document management server 1201 in place of or in addition to a local HD of a client PC. Save and read processes of book files between the print control application 104 and document management server 1201 are executed via the DS client 108 and a DS core 1212.

The print central management server 1201 manages print processes of book files stored in the client document processing system 1200 or document management server 1201. A print request at the client is transmitted to a DOMSWG server module 1221 of the print central management server 1202 via the DOMS driver 109 and DOMS print service module 110. The print central management server 1202 passes digital original data to the print application 105 via the DOMS print service module 110 of the client when a client printer is used to print. On the other hand, the server 1202 transmits data to a DOMS print service module 1231 of the print server 1203 when the print server 1203 is used to print. The print central management server performs security check processes about the authenticity of users who issued print requests to saved book files, and saves print process logs. In this manner, the document processing system can be implemented as either a standalone system or a client-server system.

<Setup of Header/footer>

The "original page header/footer setup" function provided by the print control application 104 of the document processing system according to this embodiment will be described below.

Figure 14:
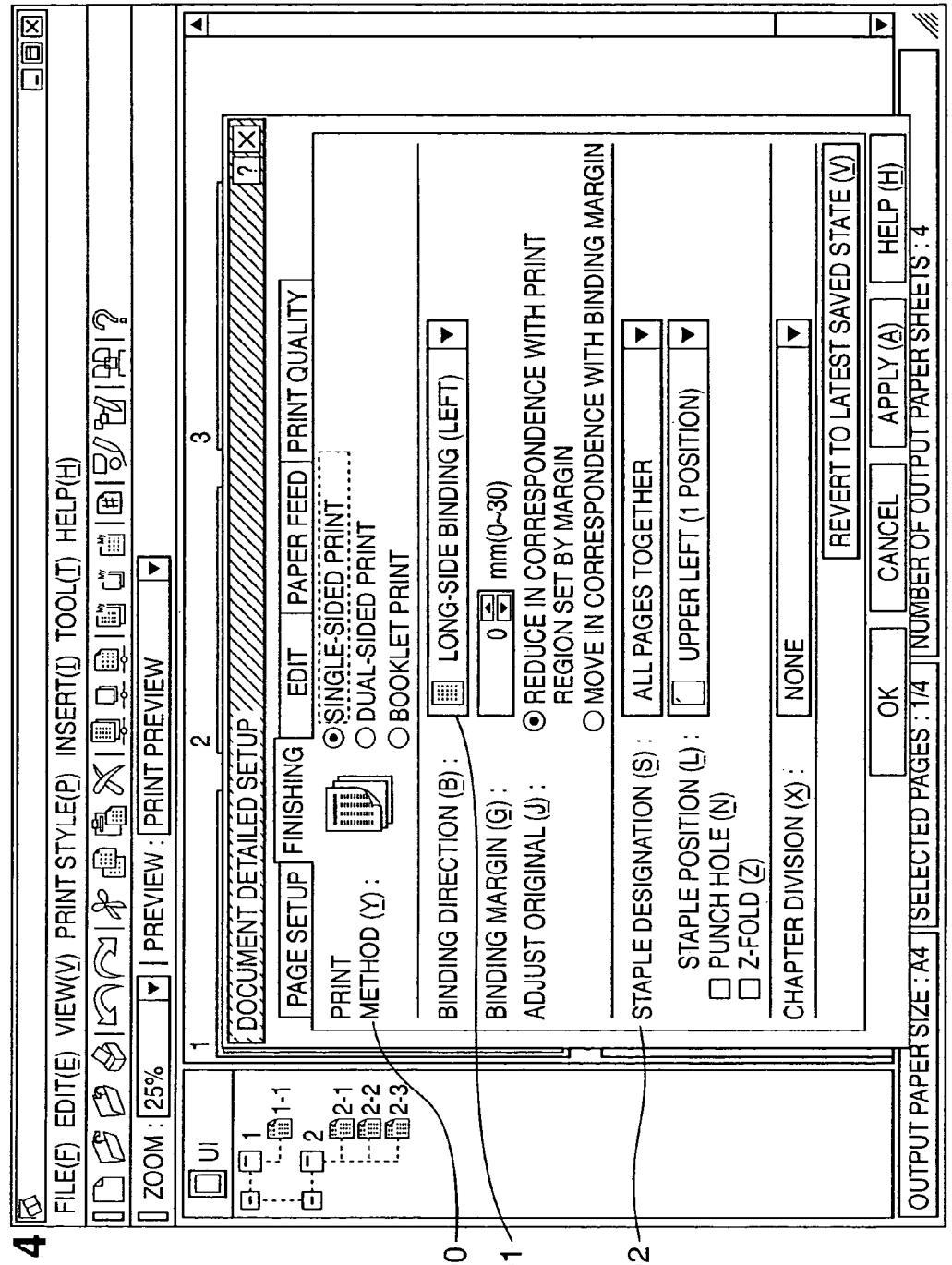
FIG. 14 shows an example of a user interface window used to set details of a document in the document processing system according to the embodiment of the present invention.

FIG. 14 shows a display example a "document detail setup" window by the print control application 104. In this case, a "finishing" sheet of the "document detail setup" window is selected, and the user can make setups associated with a print method, and finishing such as designation of staple, punch, Z-fold, and the like.

A print method designation field 1400 in FIG. 14 is an area used to select a print method, and one of "single-sided, dual-sided, and booklet" can be designated as a setup of a print method for a print sheet. A binding direction designation field 1401 is an area used to designate a binding direction, which can be selected from "long-side binding (left)", "long-side binding (right)", "short-side binding (left)", and "short-side binding (right)". In this case, "long-side binding (left)" is selected. Furthermore, a staple designation field 1402 (also called a binding setup field 1402) allows the user to designate a staple function. In this case, it is designated that all pages are to be stapled together. A binding margin and binding direction (corresponding to a binding position) designated on the window of FIG. 14 are saved in the edit information file 111 by the print application 104 (corresponding to print setup means) as some data of "4. binding margin/binding direction" in FIG. 4A. Also, a print direction is saved as "3. paper direction" in FIG. 4A.

Figure 28:
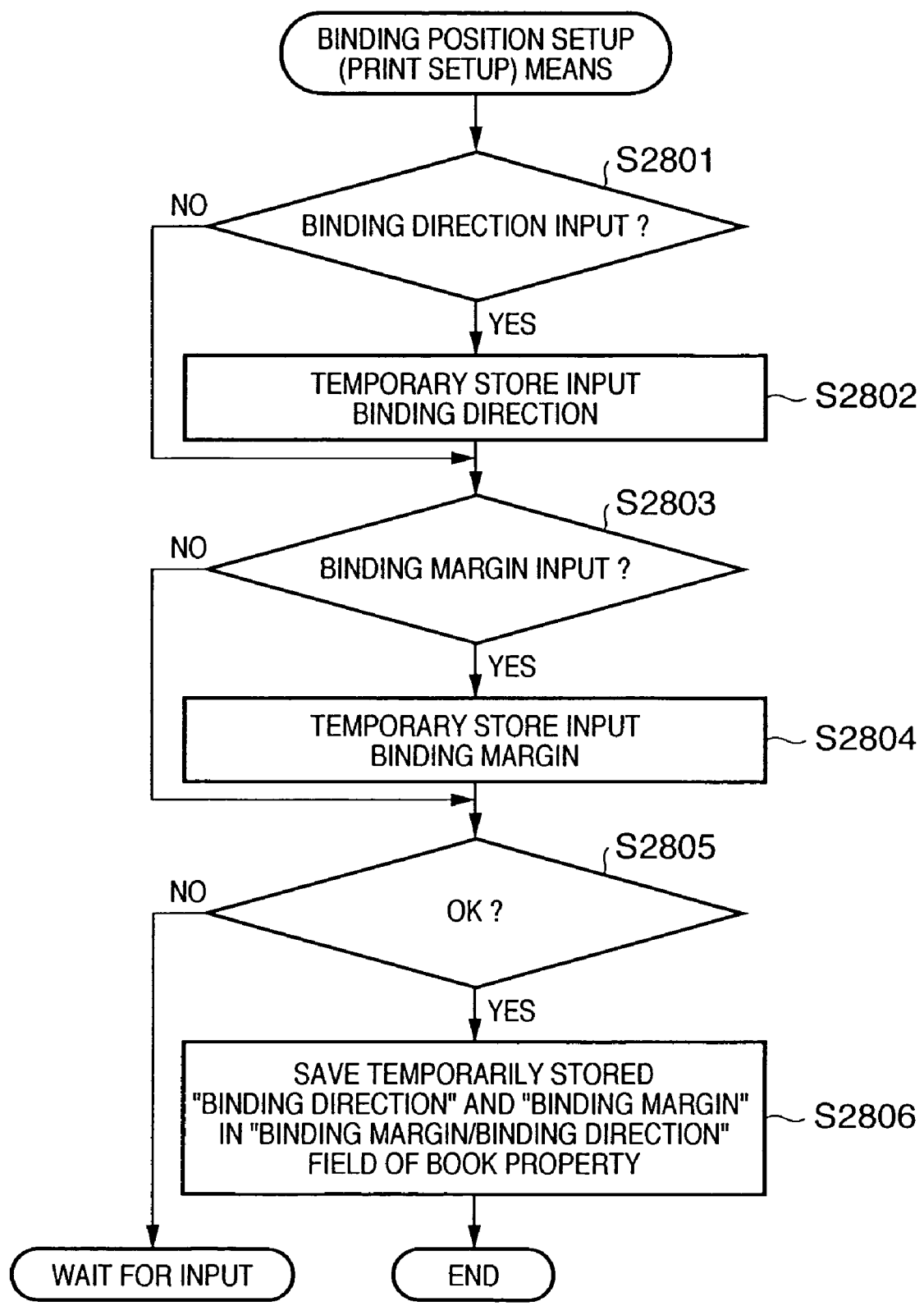
FIG. 28 is a flowchart showing an example of a binding position setup sequence in the embodiment of the present invention.

FIG. 28 is a flowchart showing the sequence for saving a binding position setup designated by the operator via the window shown in FIG. 14 upon binding printouts by a finisher. This sequence corresponds to the "print setup means" 104a in FIG. 1. Note that FIG. 28 shows only processes associated with a setup of the binding position of print setups.

The process in FIG. 28 is executed from a state wherein the window shown in FIG. 14 is displayed. Note that FIG. 28 shows some of processes executed when the operator makes inputs to the window in FIG. 14. Also, the process is simplified for the sake of convenience. Referring to FIG. 28, if a binding direction is input (step S2801—YES), data indicating the input binding direction is temporarily stored in a RAM or the like (step S2802). If a binding margin is input next (step S2803—YES), data indicating the input binding margin is temporarily stored in the RAM or the like (step S2804). Finally, if a settlement button ("apply" or "OK") is pressed (step S2805—YES), the temporarily stored data indicating the binding direction and margin are saved in the edit information file as "binding margin/binding direction" of the book property shown in FIG. 4A (step S2806). Note that a binding position is determined by the binding margin and binding direction.

Figure 15:
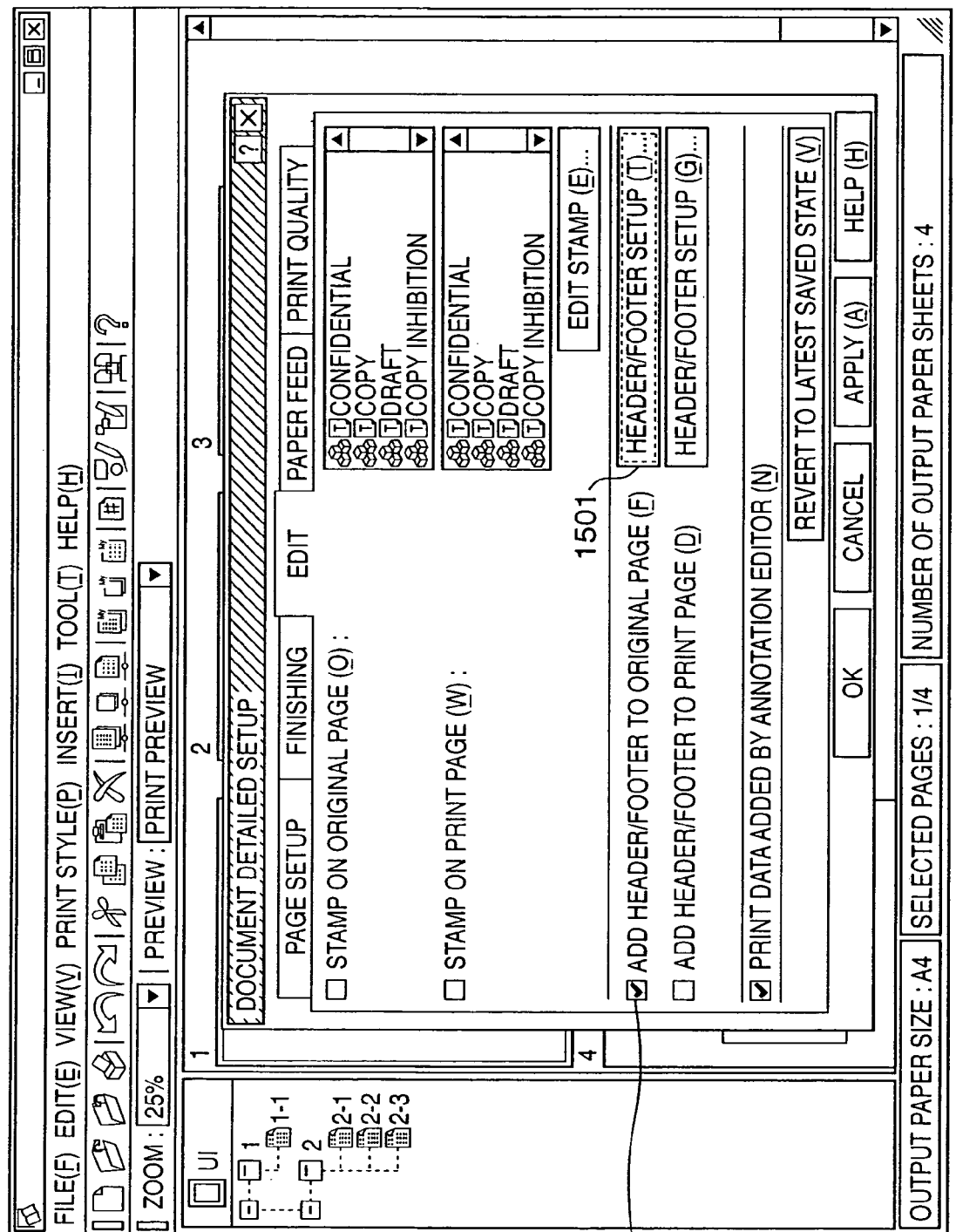
FIG. 15 shows an example of a user interface window used to set a header/footer of each page in the document processing system according to the embodiment of the present invention.

FIG. 15 shows a user interface (UI) of an "edit" sheet" of the "document detail setup" function provided by the print control application 1401. With this sheet, the user can make setups for adding "watermark", "header/footer", and the like to digital original data of the save file. Referring to FIG. 15, a check box 1500 is used to designate whether or not a header or footer such as a page number and the like is to be added to original pages. When the user checks the check box 1501, a button 1501 is enabled, and the print control application 104 (corresponding to display control means) displays a window used to make an "original page header/footer setup" shown in FIG. 16. With this window, the user can set details of a header/footer to be added to digital original data.

Figure 16:
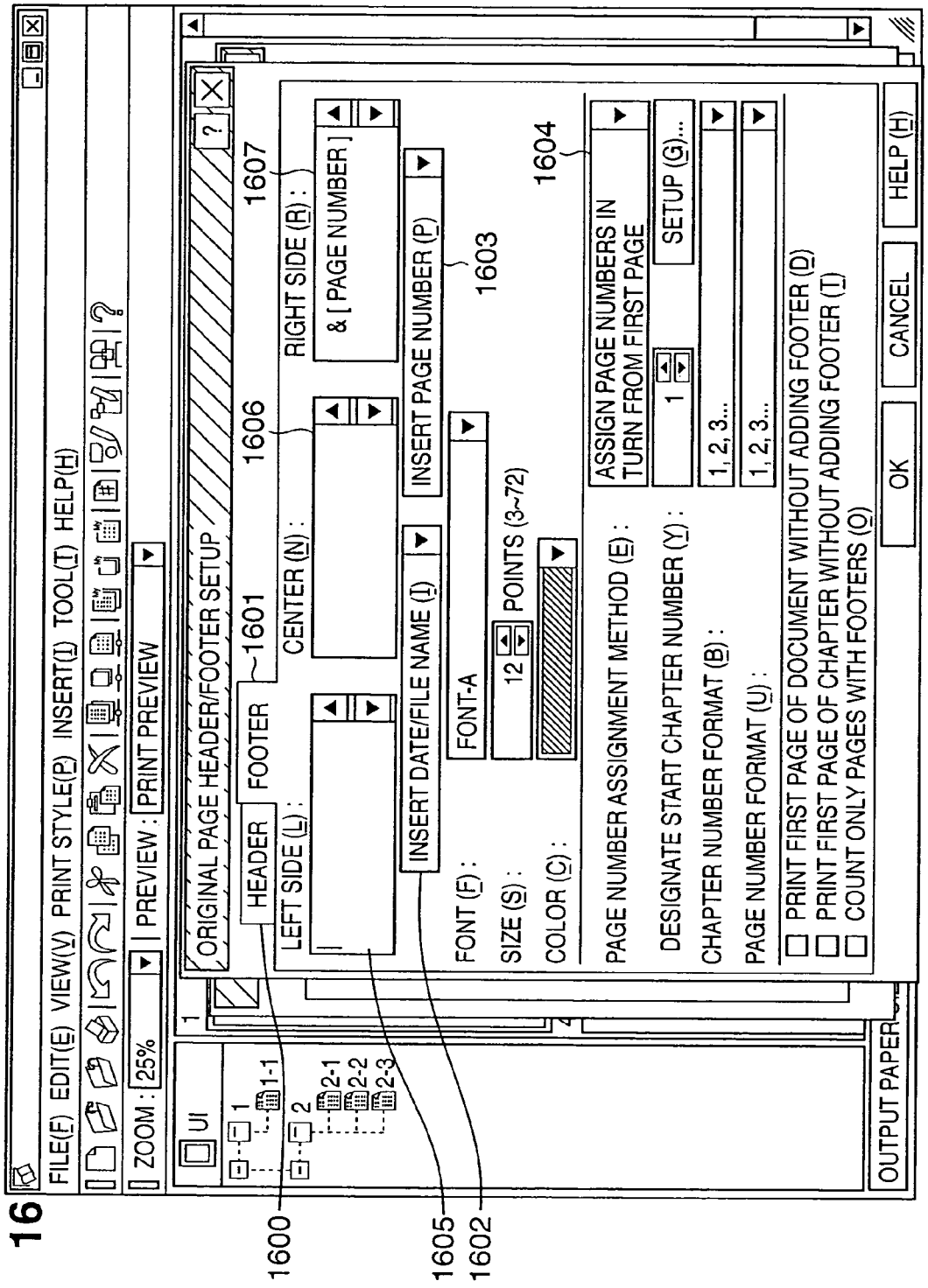
FIG. 16 shows an example of a user interface window used to set a header/footer of each page in the document processing system according to the embodiment of the present invention.

On sheets 1600 and 1601 in FIG. 16, the user can make setups of a header and footer, respectively. Note that the UI window in FIG. 16 is displayed when "single-sided print" is designated as the print method or when "dual-sided print" or "booklet print" is designated as the print method and no binding margin for staple or punch hole is set.

Since the window for setting a footer is selected in FIG. 16, the user can make a footer setup. A button 1602 allows the user to designate a date and file name in the footer. A button 1603 allows the user to designate insertion of a page number as the footer. An area 1604 is used to designate an assignment method of page numbers. In this example, since "assign page numbers in turn from first page" is selected, page numbers are assigned in turn like 1, 2, . . . from the first page. Areas 1605, 1606, and 1607 are boxes used to designate the contents of the footer to be described on the left side, center, and right side of a page as fixed positions of additional information rendering positions. The user can designate text using an arbitrary character font. The values designated by the user on these areas are saved in the edit information file 111 by the print application 104 (corresponding to additional information setup means). In this example, the user has made a setup of inserting "page number" on the right side of a page as a footer.

Figure 17:
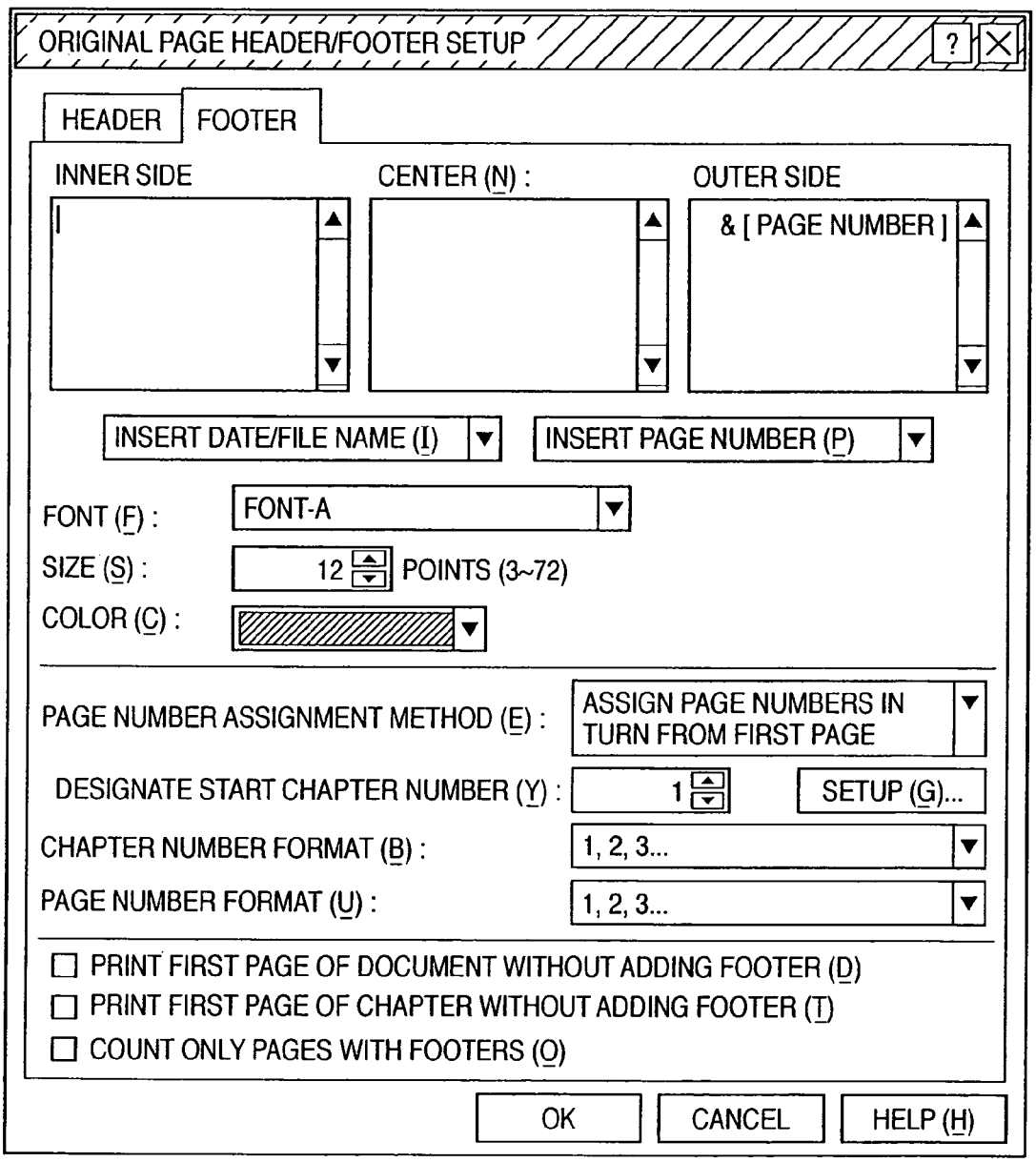
FIG. 17 shows an example of a user interface window that has automatically switched a header/footer setup window according to the embodiment of the present invention.

FIG. 17 shows a display example of an "original page header/footer setup" window displayed upon depression of the header/footer setup button 1501 in FIG. 15 when the "dual-sided print" or "booklet print" is designated as the print method 1400, and a binding margin for staple or punch hole is set, at the UI in FIG. 14. Compared to the window shown in FIG. 16, header/footer content designation boxes 2500, 2501, and 2502 are switched from "left side, center, right side" in FIG. 16 to "inner side, center, outer side" as relative positions to a page as the additional information rendering positions. When the user designates to add a header (or footer) on the "outer side", he or she can designate to insert the headers (or footers) on the outer sides (the sides opposite to a binding margin) of two-page spread of a document. In case of "inner side", the user can designate to insert the headers (or footers) on the sides opposite to the "outer side". In the example of FIG. 17, the user designates to insert a page number on the "outer side" of a footer. The value designated by the user is saved in the edit information file 111 by the print application 104 (corresponding to additional information setup means).

The contents, format, page number assignment method, and the like of a header/footer, and the print position ("left side, center, right side" or "outer side, center, inner side") of the header/footer designated on the window in FIG. 16 or 17 are saved as some parameters of the "8. header/footer" property in FIG. 4B in the edit information file 111.

In this manner, the display contents of the "original page header/footer setup" window are automatically switched in correspondence with the contents set by the user via the print control application 104, i.e., the print method setup and binding setup in FIG. 14. Also, when "dual-sided print" or "booklet print" as a temporary setup is switched to "single-sided print" on the print method designation field 1400 in FIG. 14, the contents of the "original page header/footer setup" window are automatically switched from "outer side, center, inner side" to previous "left side, center, right side". Likewise, when a setup "all pages together" as a temporary staple designation is switched to "none" on the binding designation field 1402 in FIG. 14, the contents of the "original page header/footer setup" window are automatically switched from "outer side, center, inner side" to previous "left side, center, right side".

<Data Structure>

The data structure of a document file to be handled by the application 101 according to the embodiment of the present invention will be described below.

Figure 18:
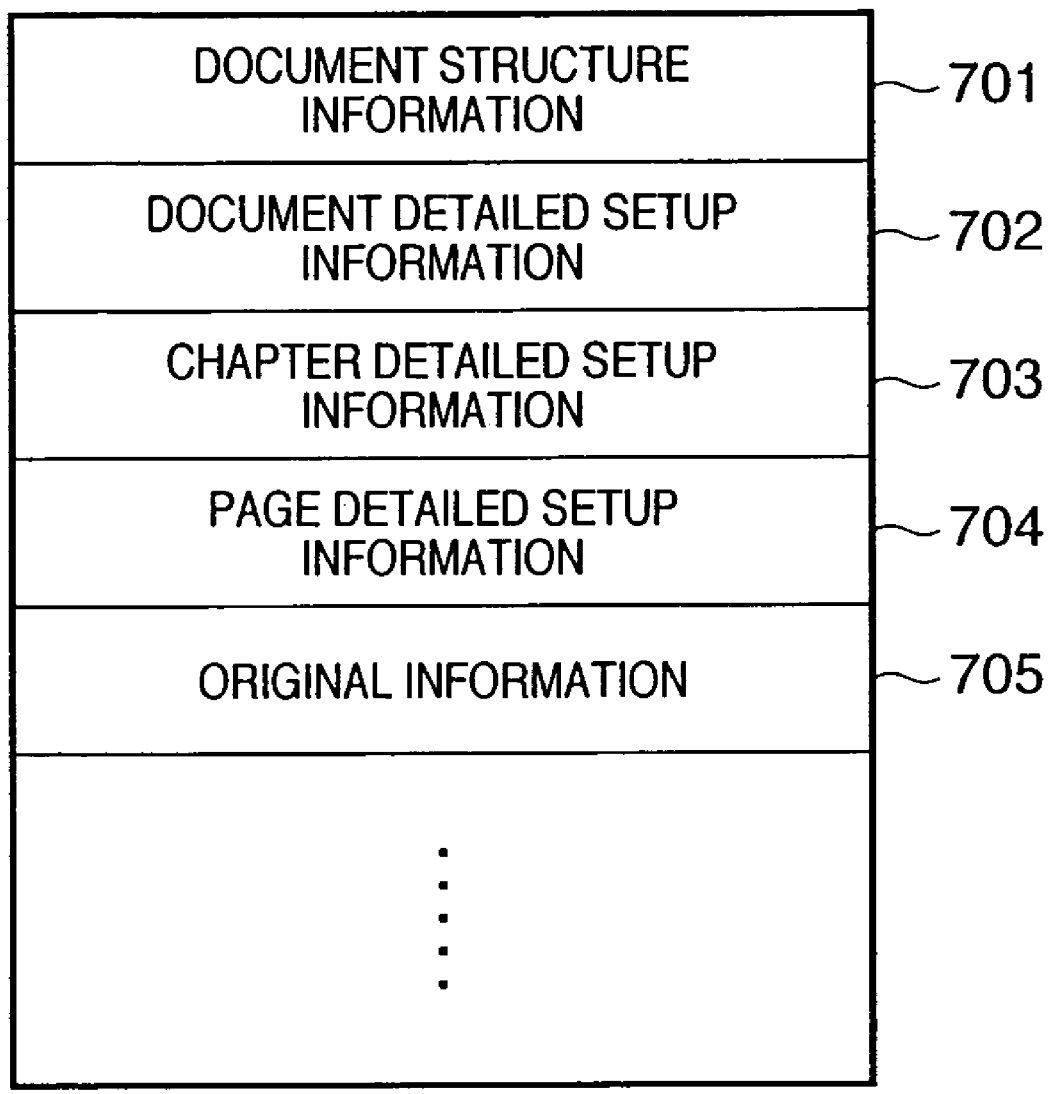
FIG. 18 shows an example of the data structure of a document file according to the embodiment of the present invention.

FIG. 18 is a table for explaining the data structure of a document file to be handled by the application 101 according to this embodiment. This document file corresponds to the edit information file 111 (FIG. 3) shown in FIG. 1. Document detailed setup information 702 corresponds to the book property shown in FIGS. 4A and 4B, chapter detailed setup information 703 corresponds to the chapter property shown in FIG. 5, and page detailed setup information 704 corresponds to the page property shown in FIG. 6. In this case, two files are stored in, e.g., the external memory 211 in FIG. 13, but may be stored in the database 1211 of the document management server 1201 in FIG. 13.

Referring to FIG. 18, document structure information 1701 stores information associated with the structure of a document to be displayed on the tree view 1101 of the application operation window shown in FIG. 10. The document detailed setup information 702 corresponds to the document setup information 403 in FIG. 3, and is a field for storing information that can be set for the whole document. The chapter detailed setup information 703 corresponds to the chapter setup information 407 in FIG. 3, and is a field for storing information that can be set for each chapter. The page detailed setup information 704 corresponds to the page setup information 411 in FIG. 3, and is a field for storing information that can be set for each page. Original information 705 stores rendering information of each original page, and saves information to be displayed on the print preview 1102 on the right side of FIG. 10 for respective pages. Note that this document file includes other kinds of information required for each document, but a detailed description thereof will be omitted.

Figure 19:
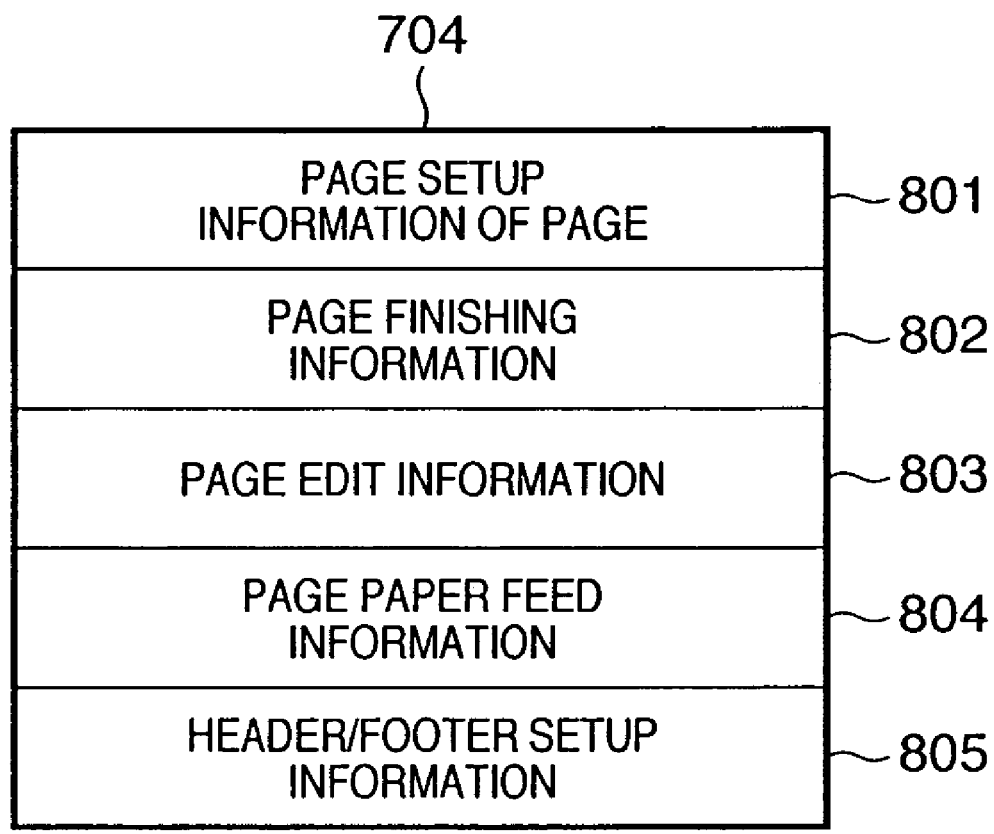
FIG. 19 shows an example of the data structure of detailed setup information of a page according to the embodiment of the present invention.

FIG. 19 is a table for explaining the data configuration of the page detailed setup information 704 in FIG. 18 in more detail. Referring to FIG. 19, reference numeral 801 denotes page setup information; 802, page finishing information; 803, page edit information; 804, page paper feed information; and 805, header/footer information. These pieces of information are stored as the page detailed setup information 704. These pieces of information are stored for each page. When a header/footer setup is made using the operation window shown in FIG. 16, such setup information is added to the header/footer information 805.

Figure 20:
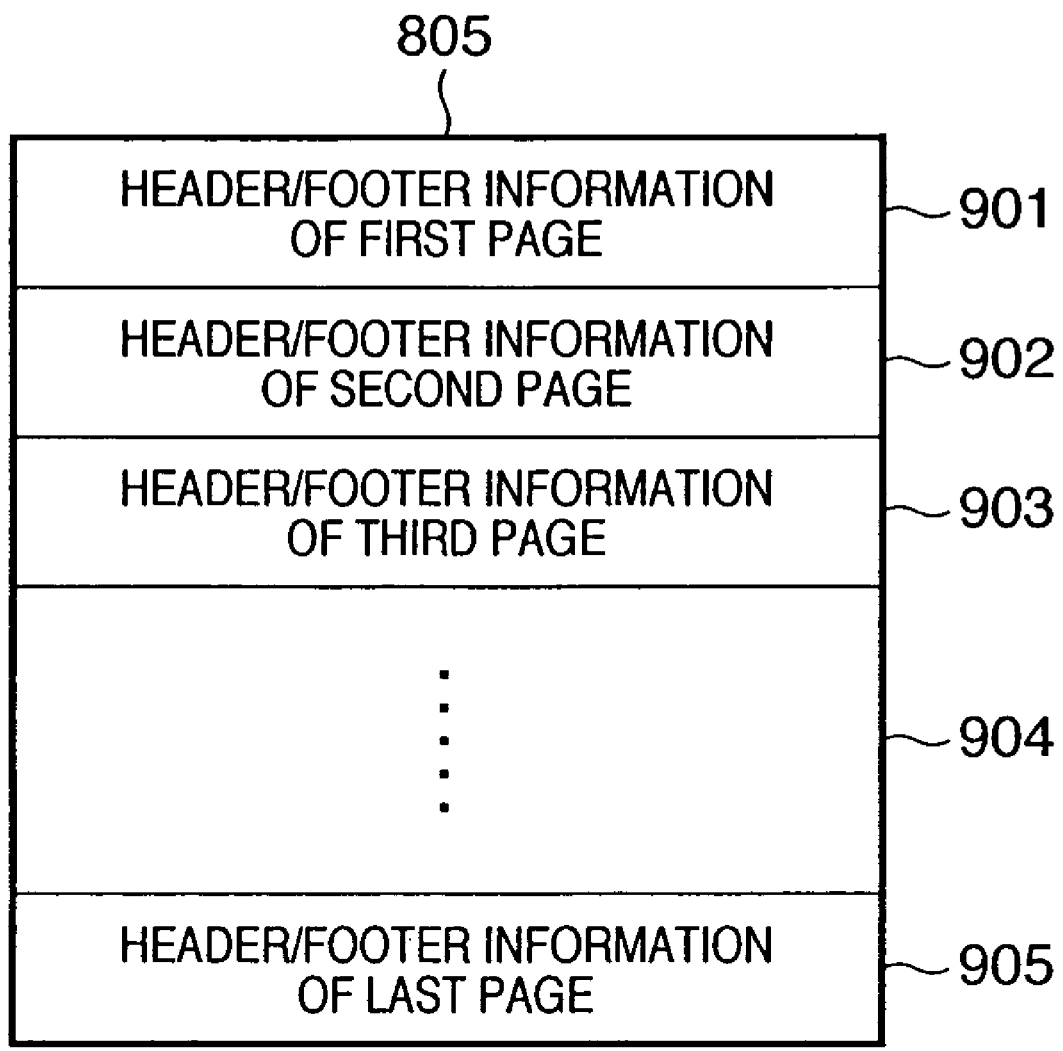
FIG. 20 shows header/footer information for respective pages according to the embodiment of the present invention.

FIG. 20 is a table for explaining information stored in the header/footer information 805 in FIG. 19 in more detail. Referring to FIG. 20, header/footer information 901 of the first page, header/footer information 902 of the second page, . . . are stored in respective fields in turn up to those (903 to 905) until the last page. This information includes only a flag used to designate whether or not a header/footer setup set for the entire document is reflected on each page. For example, when a setup that adds a header such as a page number and the like to each page of a document is allowed in FIG. 15, header/footer information fields as many as the number of all original pages are assured. In the following description, assume that a header/footer setup is allowed for each page.

In FIG. 20, headers/footers for respective pages are successively stored. However, such storage state does not indicate that the headers/footers are physically successively assigned, but successively expresses a plurality of pieces of header/footer setup information held in the page setup information 411 of respective pages in the structure shown in FIG. 3.

Note that "header/footer setup information" is also included in the document detailed setup information 702, and saves the contents of a header/footer to be printed at the designated position.

The header/footer information need only be saved as data corresponding to its input area: for example, first header/footer information input from the area 1605 in FIG. 16 or box 2500 in FIG. 17, second header/footer information input from the area 1606 in FIG. 16 or box 2501 in FIG. 17, third header/footer information input from the area 1607 in FIG. 16 or box 2502 in FIG. 17, and so forth. The correspondence between each data and its layout position is determined in accordance with the "print method" setup in the document detailed setup information 702 (this sequence will be explained later). For example, if the print method is "single-sided print", the first header/footer information is laid out on the right side, the second header/footer information is laid out on the center, and the third header/footer information is laid out on the left side. On the other hand, if the print method is "dual-sided print" or "booklet print", the first header/footer information is to be printed on the inner side, the second header/footer information is to be printed on the center, and the third header/footer information is to be printed on the left side. In this manner, the print position of each header/footer is determined. Headers/footers are added to respective pages in accordance with the determined positions. Since the inner side, center, and outer side are relative positions to the binding position, practical positions are determined for respective pages in accordance with the binding position.

<Automatic Switching of Page Number Description Position>

The processing sequence of the print control application 104 executed when the header/footer setup window in FIG. 16 or 17 is displayed upon depression of the "header/footer setup" button 1501 on the UI window in FIG. 15 will be described below with reference to FIGS. 21 and 22.

Figure 21:
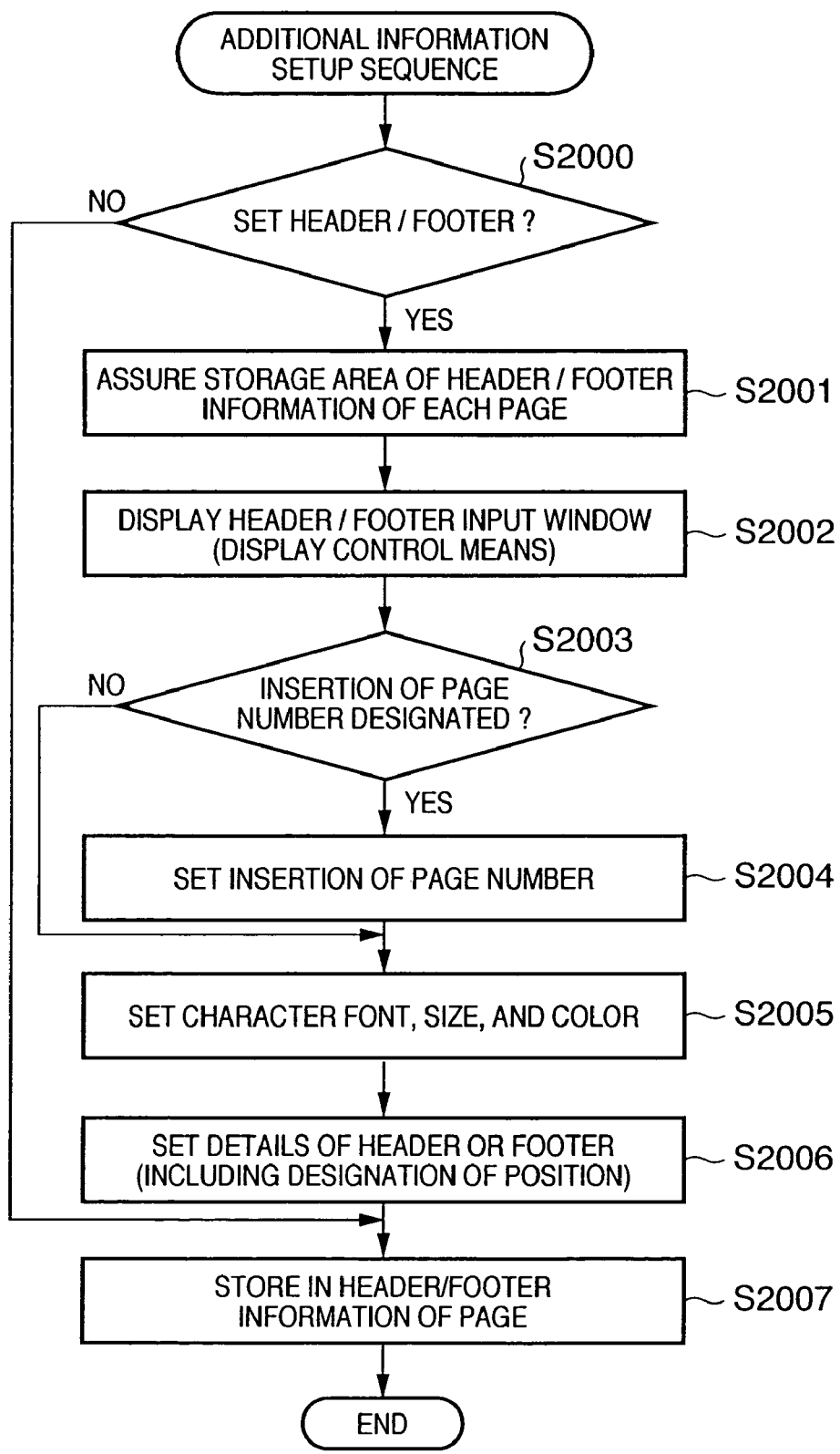
FIG. 21 is a flowchart for explaining a page number setup process according to the embodiment of the present invention.

FIG. 21 is a flowchart showing a header/footer information input process. The sequence shown in FIG. 21 corresponds to "additional information setup means" 104b shown in FIG. 1. If a "header/footer setup process" is launched in response to depression of the button 1501 on the window in FIG. 15, and the UI shown in FIG. 16 (or FIG. 17) is opened in step S2000, the flow advances to step S2001, and the print control application 104 assures header/footer information storage areas for the required number of pages, as shown in FIG. 17.

In step S2002, the print control application 104 displays the header/footer input windows (input fields) 1605 to 1607 or 2500 to 2502.

The print control application 104 checks in step S2003 if insertion of a page number is designated by the button 1603 in FIG. 16. If insertion of a page number is designated, the flow advances to step S2004 to make a setup for inserting a page number as a header (or footer).

Next, the print control application 104 prompts the user to designate a font, size, color, and the like used upon printing header (or footer) text, and sets designated values in step S2005. The flow advances to step S2006. In step S2006, the print control application 104 prompts the user to make further detailed setups for each page, or to designate a practical text character string upon inserting data other than a page number as a header (or footer), and makes detailed setups such as a page number assignment method and the like upon designating a page number.

In step S2006, if the information set in this way is that for each page, the print control application 104 stores that information as header/footer information of the page of interest in the header/footer setup information for each page shown in FIG. 20. If the set information is that for a document, the information is stored as header/footer information in the document detailed setup information 702 shown in FIG. 17.

On the other hand, if it is determined in step S2000 that no setup for inserting a header/footer is made, the flow jumps to step S2007, and the print control application 104 stores the set information as header/footer information of the corresponding page. As described above, the contents of headers/footers to be printed at designated positions can be identifiably stored like the first header/footer information, second header/footer information, and third header/footer information.

<Switching Process of Header/footer Setup Window>

Figure 22:
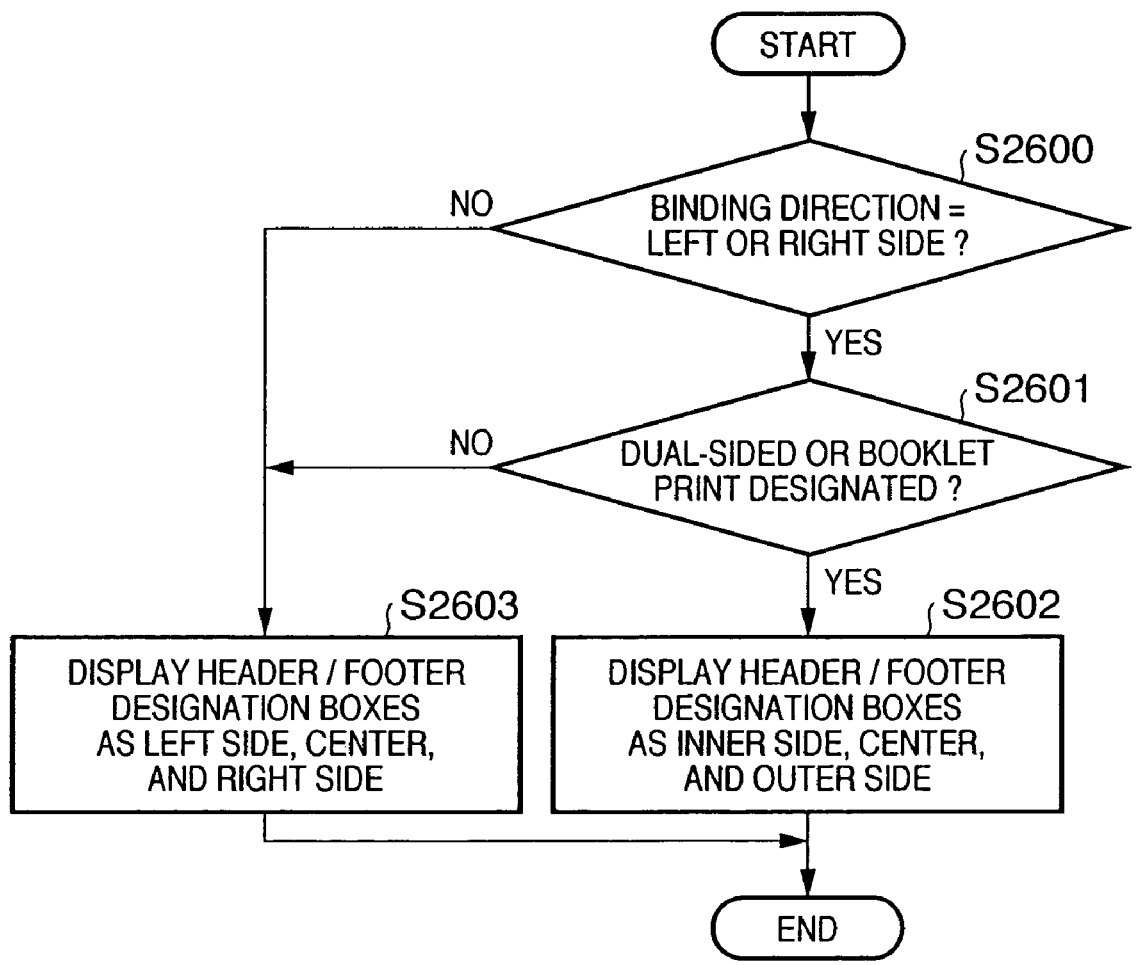
FIG. 22 is a flowchart for explaining automatic switching of the header/footer setup window according to the embodiment of the present invention.

FIG. 22 is a flowchart for implementing an example of the window display process in step S2002 in FIG. 21.

The print control application 104 checks with reference to the setup values of "binding margin/binding direction" in the document detailed setup information 702 in step S2600 if the staple function is designated, and the binding direction is set on the left or right side.

If it is determined that the staple function is designated, and the binding direction is set on the left or right side, the flow advances to step S2601. The print control application 104 then checks with reference to the setup value of "print method" in the document detailed setup information 702 if "dual-sided print" or "booklet print" is set.

If "dual-sided print" or "booklet print" is set as "print method", "inner side, center, outer side" are respectively displayed on the upper portion of the "original page header/footer setup" window as relative additional information rendering positions to a page in step S2602 (see FIG. 17). On the other hand, if it is determined in step S2600 that no staple function is designated or the binding direction is top or bottom, or if it is determined in step S2601 that "single-sided print" is set, the flow advances to step S2603 to display "left side, center, and right side" on the upper portion of the "original page header/footer setup" window as fixed additional information rendering positions with respect to a page (see FIG. 16).

That is, on the input window in FIG. 17, the inner side corresponds to the first header/footer information, the center corresponds to the second header/footer information, and the outer side corresponds to the third header/footer information.

On the input window in FIG. 16, the left side corresponds to the first header/footer information, the center corresponds to the second header/footer information, and the right side corresponds to the third header/footer information.

<Print Process Including Header/footer>

Figure 23:
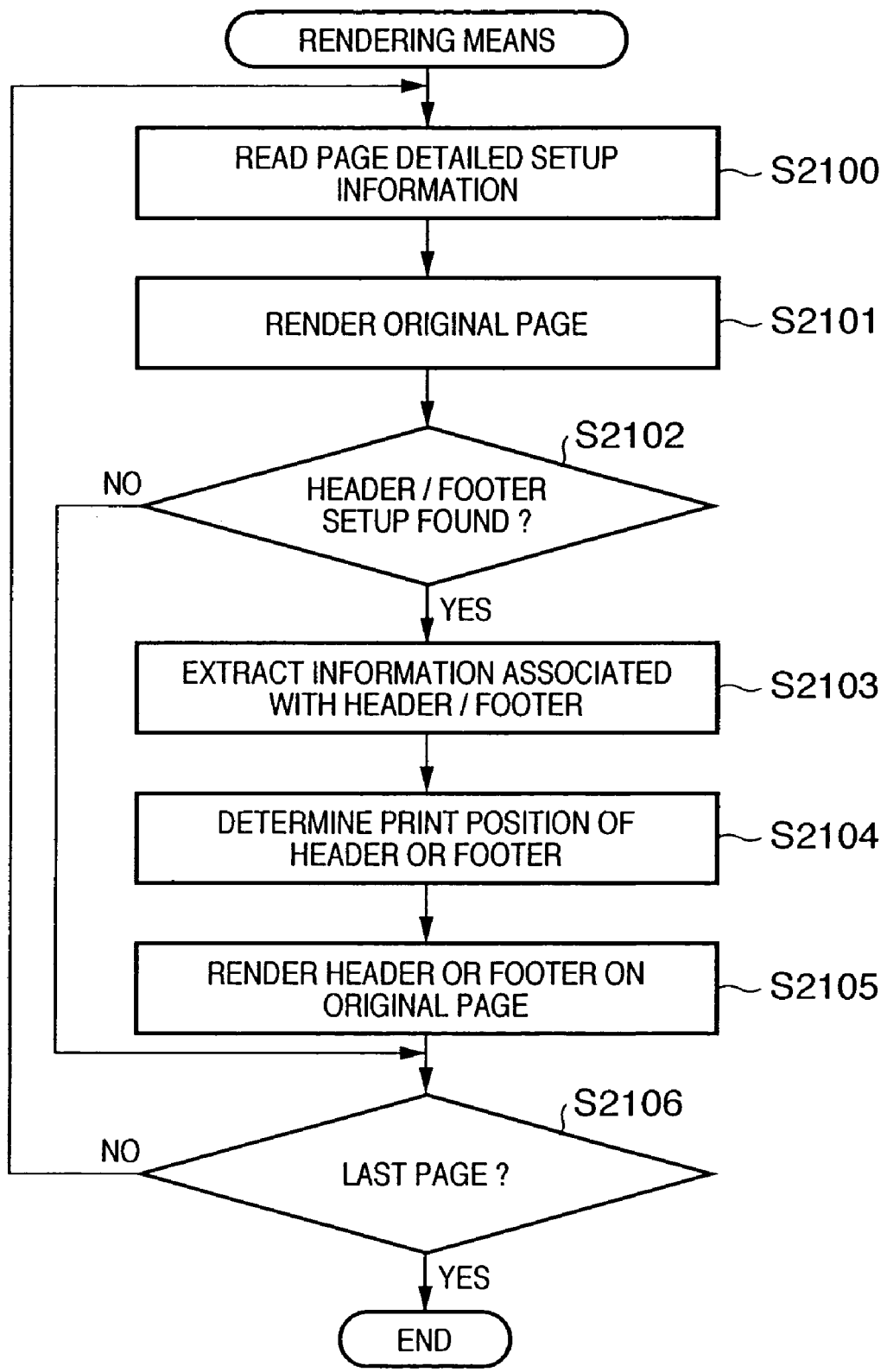
FIG. 23 is a flowchart showing a print process of document information including page numbers according to the embodiment of the present invention.

FIG. 23 is a flowchart showing the print process (print data generation process) of a header/footer of a document by the despooler 105 (print application) according to this embodiment. This sequence corresponds to "rendering means" 104c shown in FIG. 1.

In step S2100, the despooler 105 reads detailed setup information for one original page of the document information shown in FIG. 18. The despooler 105 calls a GUI function required to print an original page on the basis of the original page information 705 (FIG. 18) of the page of interest. In step S2101, if, e.g., "booklet print" is set, each original page is laid out on a paper sheet so that an appropriate order is obtained after bookbinding. This layout is determined in accordance with a booklet unit (the number of sheets to be folded into two).

In step S2102, the despooler 105 extracts the header/footer information 805 (FIG. 19) of the page, which is included in the page detailed setup information read in FIG. 18. It is checked based on this header/footer information 805 (FIG. 20) if a setup associated with a header/footer is made. If such setup is made, the despooler 105 extracts information associated with a header/footer from the information 805 (FIG. 20) in step S2103. The despooler 105 determines the rendering position of a header (or footer) on the basis of this information and print setup information set by the print control application 104 in step S2104. In this case, one of the positions of the aforementioned first header/footer information, second header/footer information, and third header/footer information is determined.

The flow advances to step S2105. The despooler 105 calls a GDI function of rendering header/footer information such as a page number or the like at the position determined in the previous step, and outputs that function to a graphic engine (GDI) as the rendering means of the OS in addition to the GDI function of an original page called in step S2101. At this time, the first header/footer information, second header/footer information, and third header/footer information are respectively rendered at the determined positions. As header/footer text, a font and character size set in the header/footer detailed setup information extracted in step S2103 are used.

The GDI function of rendering the original page added with the header/footer, which is generated in this way, is converted by the graphic engine into a rendering function (DDI function) that the printer driver 106 can interpret. As described above, the printer driver 106 generates print data in a printer control language that the printer 107 can interpret in accordance with the rendering function passed from the graphic engine, thus executing a page number rendering process.

Upon completion of the rendering process of that original page, the flow advances to step S2106 to check if the page of interest is the last page of the document. If the page of interest is not the last page, the flow returns to step S2100 to extract the detailed setup information of the next page, render an original page, and execute the same process as that described above. Upon completion of the print process of all original pages of that document and the headers/footers added to these pages, this print process ends.

The data rendered in this way is output to the system spooler 122 in FIG. 1, and a print job is issued to the printer 107 to execute an actual print process.

On the other hand, if it is determined in step S2102 that no setup for adding a header/footer is made for that page, the flow jumps to step 2106 after the despooler 105 renders only an original page in step S2101.

The page number description position determination process in the embodiment of the present invention as details of step S2104 in FIG. 23 will be described below using the flowchart of FIG. 24. In this embodiment, assume that the print direction is "portrait". This sequence corresponds to "rendering position determination means" included in "rendering means" 104c in FIG. 1.

Figure 24:
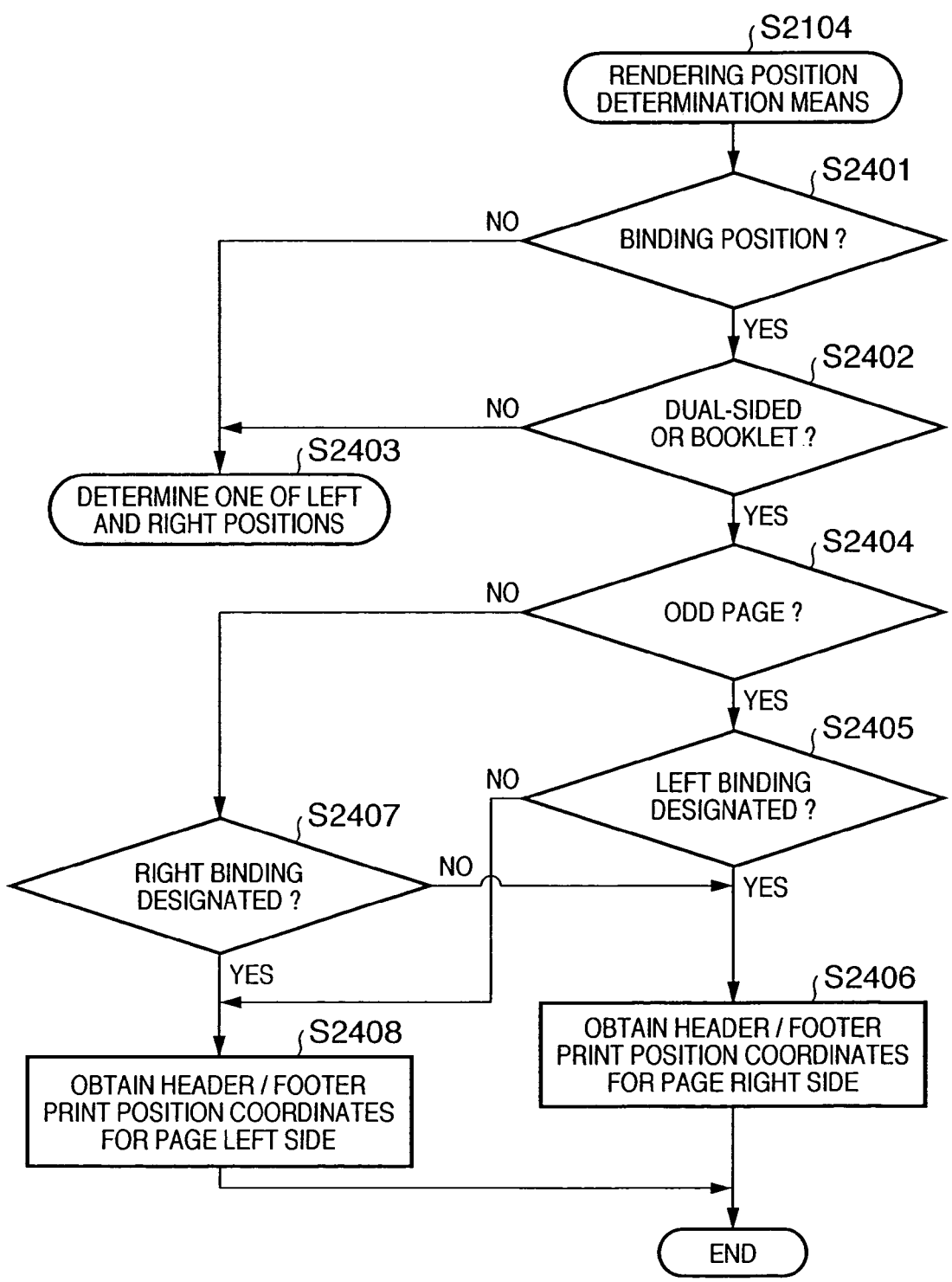
FIG. 24 is a flowchart for explaining an automatic switching process of page number description positions according to the embodiment of the present invention.

FIG. 24 is a flowchart showing an example of a process executed when the despooler 105 dynamically determines a header (or footer) description position on the basis of the job ticket generated by the print control application 104.

It is checked with reference to the document detailed print setups in step S2401 if a staple setup is made, and the binding position is right or left. If this condition is met, it is checked with reference to the document detailed print setups in step S2402 if one of "dual-sided print" and "booklet print" is set as the print method. If neither the condition in step S2401 nor the condition in step S2402 are met, a layout position of the set character string is determined for one of the left side, right side, and center.

If it is determined in step S2404 that the original page of interest is an odd page, the flow advances to step S2405 to check with reference to the document detailed print setups or page detailed print setups if the designated binding direction is the left side. In this embodiment, it is checked if "left binding (the "portrait" print direction and "long-side binding (left)" is designated. However, the present invention is not limited to this. For example, if the print direction="portrait" and binding position="long-side binding" are set, it may be checked if the open direction is "left opening". In this case, the same result is obtained due to the same setup contents.

If left binding is designated, the despooler 105 obtains the coordinates of a print position upon adding a header/footer on the right side of a page in step S2406. If it is determined in step S2405 that the binding direction is the right side, the flow advances to step S2408, and the despooler 105 obtains the coordinates upon rendering a header/footer on the left side. On the other hand, if it is determined in step S2404 that the page of interest is an even page, and it is determined in step S2407 that the binding direction is right, the flow advances to step S2408, and the despooler 105 obtains the coordinates of a header/footer print position on the left side. Furthermore, if it is determined that the binding direction is left, the flow advances to step S2406, and the despooler 105 obtains the coordinates of a header/footer print position on the right side.

In this manner, the rendering position of a header/footer such as a page number or the like on a page can be dynamically changed in accordance with the print setup information of the binding position set by the print control application 104 upon printing.

An example of the sequence for obtaining the coordinates of a header/footer print position for the right side of a page in step S2406 will be explained below. As the header/footer position, the coordinates can be obtained by, e.g., selecting a predetermined position. For example, a right inner position, right central position, and right outer position are determined in advance as print position coordinates for the right side of a page. In this case, as the position to be determined, the side closer to the binding position is the inner side, and the side farther from the binding position is outer side. Also, for example, the position for the inner side is determined with reference to the inner side of a header/footer character string, the position for the center is determined with reference to the center of a header/footer character string, and the position for the outer side is determined with reference to the outer side of a header/footer character string. Of course, the present invention is not limited to such specific method. Then, the right inner position, right central position, and right outer position are respectively stored in areas on a memory, which respectively indicate the rendering positions of first header/footer information, second header/footer information, and third header/footer information.

In step S2105 in FIG. 23, header/footer character strings are rendered in correspondence with respective reference positions determined in step S2406. That is, the first header/footer information, second header/footer information, and third header/footer information are respectively rendered at the rendering positions of first header/footer information, second header/footer information, and third header/footer information stored by the process in FIG. 24. Hence, in this embodiment, since the first header/footer information, second header/footer information, and third header/footer information respectively correspond to the inner, center, and outer sides of the input window in FIG. 17, the first header/footer information is rendered at the right inner position, the second header/footer information is rendered at the right central position, and the third header/footer information is rendered at the right outer position.

The same applies to respective positions for the left side of a page determined in step S2408. Of course, a left inner position, left central position, and left outer position are respectively stored in the areas on the memory, which respectively indicate rendering positions of first header/footer information, second header/footer information, and third header/footer information. Then, the first header/footer information, second header/footer information, and third header/footer information are respectively laid out these positions.

Likewise, the left, central, and right positions are given in advance in step S2403, and are respectively stored in the areas on the memory, which respectively indicate the rendering positions of first header/footer information, second header/footer information, and third header/footer information.

Note that the binding position in the booklet print mode is the center of a paper sheet, and original pages are laid out on regions obtained by equally dividing a paper sheet into two by the central portion of the long side. For this reason, the rendering positions of first header/footer information, second header/footer information, and third header/footer information must undergo coordinate conversion to have a paper center line (score) as the binding position upon rendering a header/footer in step S2105. Note that header/footer rendering positions for the booklet print mode may be given in advance in step S2406 or S2408 without any coordinate conversion upon rendering, and may be stored as the rendering positions of first header/footer information, second header/footer information, and third header/footer information when the booklet print mode is set.

The processes in FIGS. 23 and 24 have been explained as part of the print process. However, the same processes are executed upon displaying a preview, and headers/footers are displayed. However, in case of preview display, even when the booklet print mode is set, correspondence between the print pages and original pages need not be taken into consideration. For this reason, for a booklet print setup upon preview display, a process for converting the header/footer position on an original page onto that on a print page (paper sheet) can be omitted.

<Correspondence to Page Layout>

When an N-up print mode that allows to lay out a plurality of (N) original pages per print page is set, N original pages are rendered on one print page to be laid out in a designated order. When the N-up print mode is set, the concept, i.e., the inner or outer side relative to the binding position, cannot be applied to original pages. For this reason, when the N-up print mode is set, the same process as that for the header/footer setup of an original page is executed in steps S2104 and S2105 for the header/footer setup of a print page. That is, in case of the N-up print mode, by executing processes while reading "original page" as "print page in FIGS. 15 to 17 and FIGS. 21 to 24, the same function as that described in this embodiment can be implemented for the N-up print mode.

In this case, of the header/footer setup of an original page, a setup for the header/footer position may be read as the right or left side. That is, the contents of a header/footer are saved in correspondence with "first position" and "third positions" in place of "outer side" and "inner side". Hence, the first position is set in correspondence with the left side, and the second position is set in correspondence with the right side upon determining the header/footer positions of respective original pages.

<Example of Preview Display and Printout>

Figure 26:
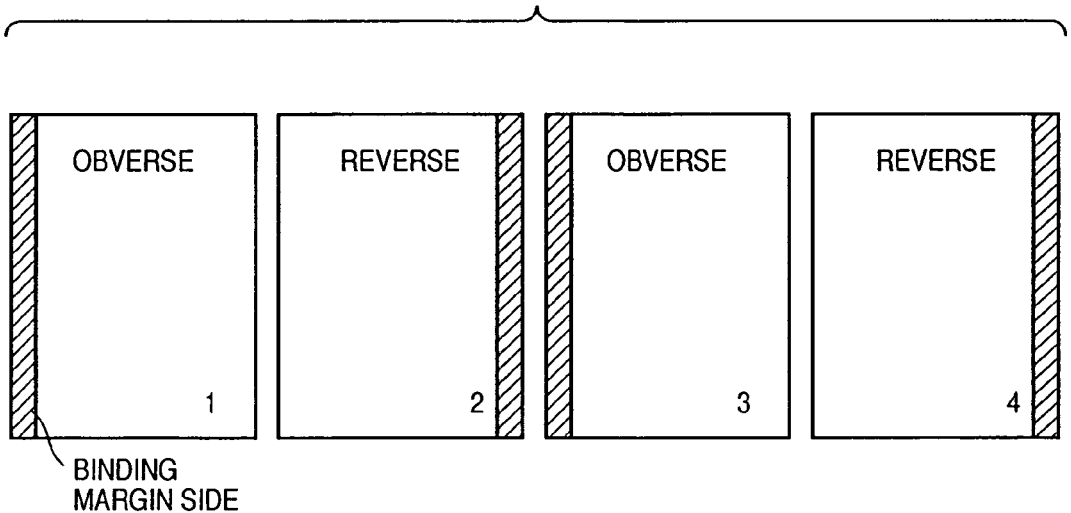
FIG. 26 shows an example of preview display of document pages when a setup is made to insert page numbers according to the embodiment of the present invention.

FIGS. 25 and 26 show examples of the print preview results after footers are actually set for a document by the "original page header/footer setup" function provided by the print control application 104.

FIG. 25 shows a preview example when the single-sided print mode is designated on the print method designation field 1400 in FIG. 14 and the setup for inserting "page number" on the right side of a page in FIG. 16 is made. In this manner, as can be seen from FIG. 24, page numbers are assigned in turn from 1 to the lower right positions of all pages.

FIG. 26 shows a preview display example in a conventional apparatus. That is, FIG. 26 shows an example of a preview result when the dual-sided print mode is set on the print method designation field 1400, "long-side binding (left)" is designated as the binding direction on the binding direction designation field 1401, and a setup for inserting a page number on the right side of a page as a footer in FIG. 16 is made. In FIG. 16, since the setup for assigning page numbers to the lower right positions of all pages, page numbers are unwantedly assigned to the binding side on obverse pages. In this way, since the conventional system allows to designate only the left side, center, and right side as the header/footer position, page numbers are often printed at inappropriate positions (e.g., on the binding side).

Figure 27:
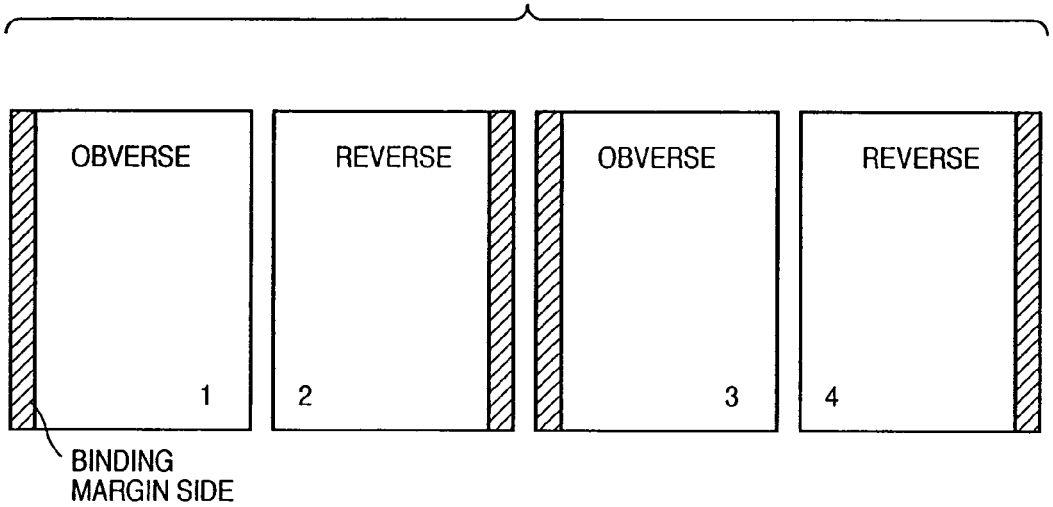
FIG. 27 shows an example of preview display of document pages when a setup is made to insert page numbers according to the embodiment of the present invention.

FIG. 27 shows a preview result when "long-side (left)" (in other words, "portrait" print direction, long-side binding, and left opening) is designated on the binding position designation field 1401 in FIG. 14, "booklet print" is designated on the print method designation field 1400, and a setup for inserting "page number" on the outer side of a page as a header in the box 2502 in FIG. 17 is made in the embodiment of the present invention. In the footers, page numbers are assigned to the outer side with respect to the binding direction, i.e., on the right side on odd pages and the left side on even pages, i.e., page numbers are assigned to the outer sides of two-page spread of every pages.

As described above, a header/footer such as a page number or the like can be appropriately and easily designated in accordance with the print setup state. In this embodiment, when the position of a page number is designated as "outer side", page numbers are automatically assigned to "outer side" positions of two-page spread in the dual-sided or booklet print mode, which requires to staple printed sheets. Furthermore, since the UI of the header/footer setup window dynamically changes in correspondence with the finishing state, an appropriate header/footer such as a page number or the like can be easily set. More specifically, when the staple function and dual-sided print mode or booklet print mode are designated, the display contents of the UI change so that relative positions to the binding position (e.g., "outer side" and "inner side") can be designated, and a relative position to the binding position can be designated.

<Other Embodiments>

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

As described above, according to the present invention, since the rendering position of a header/footer such as a page number or the like dynamically changes on the basis of the finishing setup state of each page, the user himself or herself need not make fine setups.

Since the UI of the header/footer setup window dynamically changes in correspondence with the print setups and the like, the user can easily set an appropriate header/footer for each page.

Especially, when designation for binding paper sheets (e.g., staple, punch, and the like) or when designation premised on binding (e.g., booklet print) is made, a relative header/footer position can be designated with reference to the binding position. For this reason, the user himself or herself need not make fine setups.

What is claimed is:

1. An information processing apparatus which communicates with a printing apparatus, comprising:
    a print setting unit adapted to set a booklet printing for generating a book or a single sided printing; and
    a display control unit adapted to display a setting screen, the setting screen including:
        at least a first character string indicating to draw a page number on an opposite side to a binding position of two-page spread of the book and a second character string indicating to draw the page number on a side of the binding position of two-page spread of the book when the booklet printing is set by said print setting unit; and
        at least a third character string indicating to draw the page number on a left side of a sheet printed by the single sided printing and a fourth character string indicating to draw the page number on a right side of the sheet printed by the single sided printing when the single sided printing is set by said print setting unit.

2. An apparatus according to claim 1, wherein said display control unit displays the setting screen including "inner side" as the first character string indicating to draw a page number on an opposite side to a binding position and "outer side" as the second character string indicating to draw the page number on a side of the binding position.

3. An apparatus according to claim 1, wherein a distance between the binding position and a position of the page number drawn at the opposite side to the binding position is longer than a distance between the binding position and a position of the page number drawn at the same side as the binding position.

4. An apparatus according to claim 1, further comprising a generation unit adapted to generate print data so that the printing apparatus prints a page number at a position set using the setting screen displayed by said display control unit based upon the print data.

5. An apparatus according to claim 4, wherein said generation unit generates print data on which a page number is printed at the rightward side of an odd page and a page number is printed at the leftward side of an even page based when the booklet printing and a left binding are selected, and drawing a page number on an opposite side to the binding position is set using the setting screen displayed by said display control unit.

6. A method of controlling an information processing apparatus which communicates with a printing apparatus, the method comprising:
    a print setting step of setting a booklet printing for generating a book or a single sided printing; and
    a display control step of displaying a setting screen including:
        at least a first character string indicating to draw a page number on an opposite side to a binding position of two-page spread of the book and a second character string indicating to draw the page number on a side of the binding position of two-page spread of the book when the booklet printing is set in said print setting step, and
        at least a third character string indicating to draw the page number on a left side of a sheet printed by the single sided printing and a fourth character string indicating to draw the page number on a right side of the sheet printed by the single sided printing when the single sided printing is set in said print setting step.

7. A method according to claim 6, wherein said display control step displays the setting screen including "inner side" as the first character string indicating to draw a page number on an opposite side to a binding position and "outer side" as the second character string indicating to draw the page number on a side of the binding position.

8. A method according to claim 6, wherein a distance between the binding position and a position of the page number drawn at the opposite side to the binding position is longer than a distance between the binding position and a position of the page number drawn at the same side as the binding position.

9. A method according to claim 6, further comprising a generation step of generating print data so that the printing apparatus prints a page number at a position set by the setting screen displayed in said display control step based upon the print data.

10. A method according to claim 9, wherein said generation step generates print data on which a page number is printed at the rightward side of an odd page and a page number is printed at the leftward side of an even page based when the booklet printing and a left binding are selected, and drawing a page number on an opposite side to the binding position is set using the setting screen displayed in said display control step.

11. A computer-readable storage medium storing a computer program for causing a computer to perform a method of controlling an information processing apparatus which communicates with a printing apparatus, the method comprising:
    a print setting step of setting a booklet printing for generating a book or a single sided printing; and
    a display control step of displaying a setting screen including:
        at least a first character string indicating to draw a page number on an opposite side to a binding position of two-page spread of the book and a second character string indicating to draw the page number on a side of the binding position of two-page spread of the book when the booklet printing is set in said print setting step, and
        at least a third character string indicating to draw the page number on a left side of a sheet printed by the single sided printing and a fourth character string indicating to draw the page number on a right side of the sheet printed by the single sided printing when the single sided printing is set in said print setting step.

12. A medium according to claim 11, wherein said display control step displays the setting screen including "inner side" as the first character string indicating to draw a page number on an opposite side to a binding position and "outer side" as the second character string indicating to draw the page number on a side of the binding position.

13. A medium according to claim 11, wherein a distance between the binding position and a position of the page number drawn at the opposite side to the binding position is longer than a distance between the binding position and a position of the page number drawn at the same side as the binding position.

14. A medium according to claim 11, wherein said method further comprising a generation step of generating print data so that the printing apparatus prints a page number at a position set by the setting screen displayed in said display control step based upon the print data.

15. A medium according to claim 14, wherein said generation step generates print data on which a page number is printed at the rightward side of an odd page and a page number is printed at the leftward side of an even page based when the booklet printing and a left binding are selected, and drawing a page number on an opposite side to the binding position is set using the setting screen displayed in said display control step.

* * * * *